United States Patent
Saptharishi et al.

(10) Patent No.: US 10,699,115 B2
(45) Date of Patent: *Jun. 30, 2020

(54) VIDEO OBJECT CLASSIFICATION WITH OBJECT SIZE CALIBRATION

(71) Applicant: AVIGILON ANALYTICS CORPORATION, Vancouver (CA)

(72) Inventors: Mahesh Saptharishi, Waltham, MA (US); Dimitri A. Lisin, Shrewsbury, MA (US); Aleksey Lipchin, Newton, MA (US); Igor Reyzin, Needham, MA (US)

(73) Assignee: AVIGILON ANALYTICS CORPORATION, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,861

(22) Filed: Aug. 2, 2019

(65) Prior Publication Data

US 2019/0354757 A1    Nov. 21, 2019

Related U.S. Application Data

(60) Continuation of application No. 16/183,669, filed on Nov. 7, 2018, now Pat. No. 10,417,493, which is a
(Continued)

(51) Int. Cl.
*G06K 9/00* (2006.01)
*G06T 7/246* (2017.01)
(Continued)

(52) U.S. Cl.
CPC ..... *G06K 9/00536* (2013.01); *G06K 9/00718* (2013.01); *G06K 9/00771* (2013.01);
(Continued)

(58) Field of Classification Search
CPC .. G06K 9/00536; G06K 9/00718; G06K 9/52; G06K 9/00771; G06K 9/6201;
(Continued)

(56) References Cited

U.S. PATENT DOCUMENTS 4,639,784 A    1/1987 Fling
4,779,095 A    10/1988 Guerreri
(Continued)

FOREIGN PATENT DOCUMENTS

CN    1456970 A    11/2003
CN    101051385 A    10/2007
(Continued)

OTHER PUBLICATIONS

International Search Report and Written Opinion, PCT/US2009/035916, dated Oct. 12, 2009.
(Continued)

*Primary Examiner* — Nhan T Tran
(74) *Attorney, Agent, or Firm* — BakerHostetler

(57) ABSTRACT

A camera system comprises an image capturing device, and connected to it are an object classification module and a calibration module. The object classification module is operable to determine whether or not an object in an image is a member of an object class, and the calibration module is operable to estimate representative sizes of the object. The object classification module may determine a confidence parameter that is used by the calibration module, or conversely, the calibration module may produce a size that is used by the classification module.

10 Claims, 19 Drawing Sheets

Related U.S. Application Data continuation of application No. 15/605,818, filed on May 25, 2017, now Pat. No. 10,127,445, which is a continuation of application No. 14/562,572, filed on Dec. 5, 2014, now Pat. No. 9,697,425, which is a division of application No. 12/397,287, filed on Mar. 3, 2009, now Pat. No. 8,934,709.

(60) Provisional application No. 61/033,349, filed on Mar. 3, 2008, provisional application No. 61/033,284, filed on Mar. 3, 2008.

(51) Int. Cl.
    *H04N 5/232*     (2006.01)
    *H04N 7/18*     (2006.01)
    *G06K 9/52*     (2006.01)
    *G06K 9/62*     (2006.01)
    *G06K 9/46*     (2006.01)
    *G06T 7/73*     (2017.01)

(52) U.S. Cl.
    CPC ............ *G06K 9/4671* (2013.01); *G06K 9/52* (2013.01); *G06K 9/6201* (2013.01); *G06T 7/246* (2017.01); *G06T 7/73* (2017.01); *H04N 5/23203* (2013.01); *H04N 5/23219* (2013.01); *H04N 5/23293* (2013.01); *H04N 7/18* (2013.01); *H04N 7/181* (2013.01); *G06T 2207/10016* (2013.01); *G06T 2207/30232* (2013.01)

(58) Field of Classification Search
    CPC .. G06K 9/4671; H04N 7/181; H04N 5/23203; H04N 5/23219; H04N 5/23293; H04N 7/18; G06T 7/73; G06T 7/246; G06T 2207/10016; G06T 2207/30232
    See application file for complete search history.

(56) References Cited

U.S. PATENT DOCUMENTS

| | | | |
|---|---|---|---|
| 4,931,868 | A | 6/1990 | Kadar |
| 5,091,780 | A | 2/1992 | Pomerleau |
| 5,099,322 | A | 3/1992 | Gove |
| 5,212,547 | A | 5/1993 | Otsuki |
| 5,253,070 | A | 10/1993 | Hong |
| 5,268,967 | A | 12/1993 | Jang et al. |
| 5,825,936 | A | 10/1998 | Clarke et al. |
| 5,933,519 | A | 8/1999 | Lee et al. |
| 6,377,296 | B1 | 4/2002 | Zlatsin et al. |
| 6,577,762 | B1 | 6/2003 | Seeger et al. |
| 6,940,998 | B2 * | 9/2005 | Garoutte ............ G06K 9/00771 348/154 |
| 6,970,083 | B2 * | 11/2005 | Venetianer ......... G06K 9/00778 340/541 |
| 7,221,775 | B2 | 5/2007 | Buehler |
| 7,227,569 | B2 | 6/2007 | Maruya |
| 7,227,988 | B2 | 6/2007 | Curry et al. |
| 7,627,171 | B2 | 12/2009 | Saptharishi et al. |
| 8,139,896 | B1 * | 3/2012 | Ahiska ................ G06T 3/0062 348/143 |
| 8,224,029 | B2 | 7/2012 | Saptharishi et al. |
| 8,255,785 | B2 | 8/2012 | Baumert et al. |
| 8,427,552 | B2 | 4/2013 | Marman et al. |
| 8,934,709 | B2 * | 1/2015 | Saptharishi ........ G06K 9/00771 382/159 |
| 9,697,425 | B2 * | 7/2017 | Saptharishi ........ G06K 9/00771 |
| 2003/0088532 | A1 | 5/2003 | Hampshire, II |
| 2003/0204368 | A1 | 10/2003 | Ertin et al. |
| 2004/0131231 | A1 * | 7/2004 | Smilansky ......... G06K 9/00778 382/103 |
| 2004/0213459 | A1 * | 10/2004 | Ishimaru ............. G06K 9/0063 382/191 |
| 2005/0002572 | A1 | 1/2005 | Saptharishi et al. |
| 2005/0073585 | A1 * | 4/2005 | Ettinger .................. H04N 7/18 348/155 |
| 2005/0104958 | A1 * | 5/2005 | Egnal ..................... G01S 3/7864 348/143 |
| 2005/0114278 | A1 | 5/2005 | Saptharishi et al. |
| 2005/0201460 | A1 | 9/2005 | Kang et al. |
| 2006/0045354 | A1 * | 3/2006 | Hanna ................. G06K 9/00771 382/224 |
| 2006/0112038 | A1 | 5/2006 | Luo |
| 2006/0239645 | A1 | 10/2006 | Curtner et al. |
| 2006/0257017 | A1 | 11/2006 | Luo |
| 2006/0279630 | A1 | 12/2006 | Aggarwal et al. |
| 2007/0035622 | A1 | 2/2007 | Hanna et al. |
| 2007/0039030 | A1 | 2/2007 | Romanwich et al. |
| 2007/0064107 | A1 | 3/2007 | Aggarwal et al. |
| 2007/0112709 | A1 | 5/2007 | Luo |
| 2007/0217688 | A1 | 9/2007 | Sabe et al. |
| 2007/0237387 | A1 | 10/2007 | Avidan et al. |
| 2007/0258645 | A1 | 11/2007 | Gokturk et al. |
| 2008/0007620 | A1 | 1/2008 | Wang et al. |
| 2008/0052262 | A1 | 2/2008 | Kosinov et al. |
| 2008/0291278 | A1 * | 11/2008 | Zhang ................. G06K 9/00771 348/159 |
| 2010/0026802 | A1 * | 2/2010 | Titus ................. G08B 13/19608 348/143 |

FOREIGN PATENT DOCUMENTS

| | | |
|---|---|---|
| DE | 10136739 A1 | 2/2002 |
| DE | 69429145 T2 | 7/2002 |
| EP | 0644414 A2 | 3/1995 |
| EP | 0191407 B1 | 12/1995 |

OTHER PUBLICATIONS

Collins et al.; "A System for Video Surveillance and Monitoring"; Robotics Institute Proc. American Nuclear Society; Eight Annual Topical Meeting on Robotics and Remote Systems; Pittsburgh PA; Apr. 1999; 17 pp.

Eveland et al.; "Background Modeling for Segmentation of Video-Rate Stereo Sequences"; Computer Vision and Patter Recognition, 1998 Proceedings; 1998 IEEE Computer Society Conference; 7 pp.

Gavrila et al.; "Real-Time Object Detection Using Distance Transformations"; 1998 IEEE Int'l Conference on Intelligent Vehicles; p. 274-279.

McIvor; "Background Subtraction Techniques"; Proc. of Image and Vision Computing; Auckland, New Zealand; 2000; 7 pp.

Mikic et al.; "Moving Shadow and Object Detection in Traffic Scenes"; 15$^{th}$ Int'l Conference on Pattern Recognition; 2000; 6 pp.

Oren et al.; "A Trainable System for People Detection"; Proceedings of Image Understanding Workshop; CBCL and AI Lab; MIT, Cambridge, MA; 1997; 8 pp.

Stenger et al.; "Topology Free Hidden Markov Model: Application to Background Modeling"; IEEE Int'l Conference on Computer Vision; 2001; 8 pp.

Freund et al.; "Experiments with a New Boosting Algorithm"; Machine Learning: Proceedings of the Thirteenth Int'l Conference; 1996; 9 pp.

Freund et al.; A Decision-Theoretic Generalization of On-line Learning and an Application to Boosting; Journal of Computer and System Sciences, 55; 119-139; 1997; 21 pp.

Freund et al.; "A Short Introduction to Boosting"; Journal of Japanese Society for Artificial Intelligence, 14(5):771-780; Sep. 1999; 14 pp.

Viola et al.; "Robust Real-Time Face Detection" Int'l Journal of Computer Vision 57(2), 137-154; 2004; 18 pp.

Saptharishi; "Sequential Discriminant Error Minimization: the Theory and Its Application to Real-Time Video Object Recognition"; Carnegie Mellon University; Pittsburgh, PA; 2005; 249 pp.

Buhlmann et al.; "Boosting Algorithms: Regularization, Prediction, and Model Fitting"; Statistical Science, vol. 22, No. 4, 477-505; 2007; 29 pp.

(56) References Cited

OTHER PUBLICATIONS

Polikar; "Ensemble Based Systems in Decision Making"; IEEE Circuits and Systems Magazine; 2006; 25 pp.
Office Action dated Nov. 14, 2008 for U.S. Appl. No. 10/884,486.
Amendment dated Mar. 16, 2009 for U.S. Appl. No. 10/884,486.
Renno et al.; "Learning Surveillance Tracking Models for the Self-Calibrated Ground Plane"; British Machine Vision Conference; 2002; 10 pp.
Benmokhtar; "Neural Network Combining Classifier Based on Dempster-Shafer Theory"; Proceedings of the Int'l Multiconference on Computer Science and Information Technology; 2006; 8 pp.
Freeman; "Orientation Histograms for Hand Gesture Recognition"; Mitsubishi Electric Research Laboratories; Dec. 1994; 8 pp.
Lowe; "Object Recognition from Local Scale-Invariant Features"; Proceedings of the Int'l Conference on Computer Vision; Sep. 1999; 8 pp.
Moreno et al.; "A Comparative Study of Local Descriptors for Object Category Recognition: SIFT vs. HMAX"; Dept. of Computer Science and Artificial Intelligence; University of Granada, ETSI; 2007; 8 pp.
Lavesson; "Quantifying the Impact of Learning Algorithm Parameter Tuning"; American Association for Artificial Intelligence; 2006; 6 pp.
Chen et al.; "A Cascade of Feed-Forward Classifiers for Fast Pedestrian Detection"; ACCV; part 1; 2007; p. 905-914.

\* cited by examiner

VIDEO OBJECT CLASSIFICATION WITH OBJECT SIZE CALIBRATION

CROSS REFERENCE TO RELATED APPLICATIONS

This application is a continuation application of U.S. application Ser. No. 16/183,669, filed Nov. 7, 2018; which continuation application of U.S. application Ser. No. 15/605,818, filed May 25, 2017, now U.S. Pat. No. 10,127,445, issued Nov. 13, 2018; which is a continuation application of U.S. application Ser. No. 14/562,572, filed Dec. 5, 2014, now U.S. Pat. No. 9,697,425, issued Jul. 4, 2017; which is a divisional application of U.S. application Ser. No. 12/397,287, filed Mar. 3, 2009, now U.S. Pat. No. 8,934,709, issued Jan. 13, 2015; which claims benefit under 35 U.S.C. § 119(e) of U.S. Provisional Application No. 61/033,349, filed Mar. 3, 2008, and U.S. Provisional Application No. 61/033,284, filed Mar. 3, 2008, all of which are incorporated herein by reference in their entireties.

TECHNICAL FIELD

This disclosure relates generally but not exclusively to video surveillance and more particularly to object classification.

BACKGROUND INFORMATION

Automated security and surveillance systems typically employ video cameras or other image capturing devices or sensors to collect image data. In the simplest systems, images represented by the image data are displayed for contemporaneous screening by security personnel and/or recorded for later reference after a security breach. In those systems, the task of detecting objects of interest is performed by a human observer. A significant advance occurs when the system itself is able to perform object detection and classification, either partly or completely.

In a typical surveillance system, for example, one may be interested in detecting objects such as humans, vehicles, animals, etc. that move through the environment. Different objects might pose different threats or levels of alarm. For example, an animal in the scene may be normal, but a human or vehicle in the scene may be cause for an alarm and may require the immediate attention of a security guard. Existing systems capable of classifying detected objects tend to use simple heuristics to distinguish broad categories of objects from one another. For example, pre-determined expectations for aspect ratio and height are used to classify a detected object as a human being. Theoretically, heuristic methods are computationally inexpensive and easy to implement, but they are much less robust than optimized parametric classifiers formed by using known machine learning algorithms such as Adaptive Boosting (AdaBoost). Known parametric classifiers, however, suffer from one or more of (1) lack of labeled data for training and (2) inability to automatically evolve.

Prior art classifiers typically require manual geometric calibration and tuning. Such calibration and tuning typically focuses on intermediate user input (e.g., object heights) that indirectly influence the system's performance and typically requires time-consuming labor by trained personnel during installation. Moreover, retuning and calibration is typically needed as the seasons change or if a camera is moved.

DETAILED DESCRIPTION OF EMBODIMENTS

Figure 1:
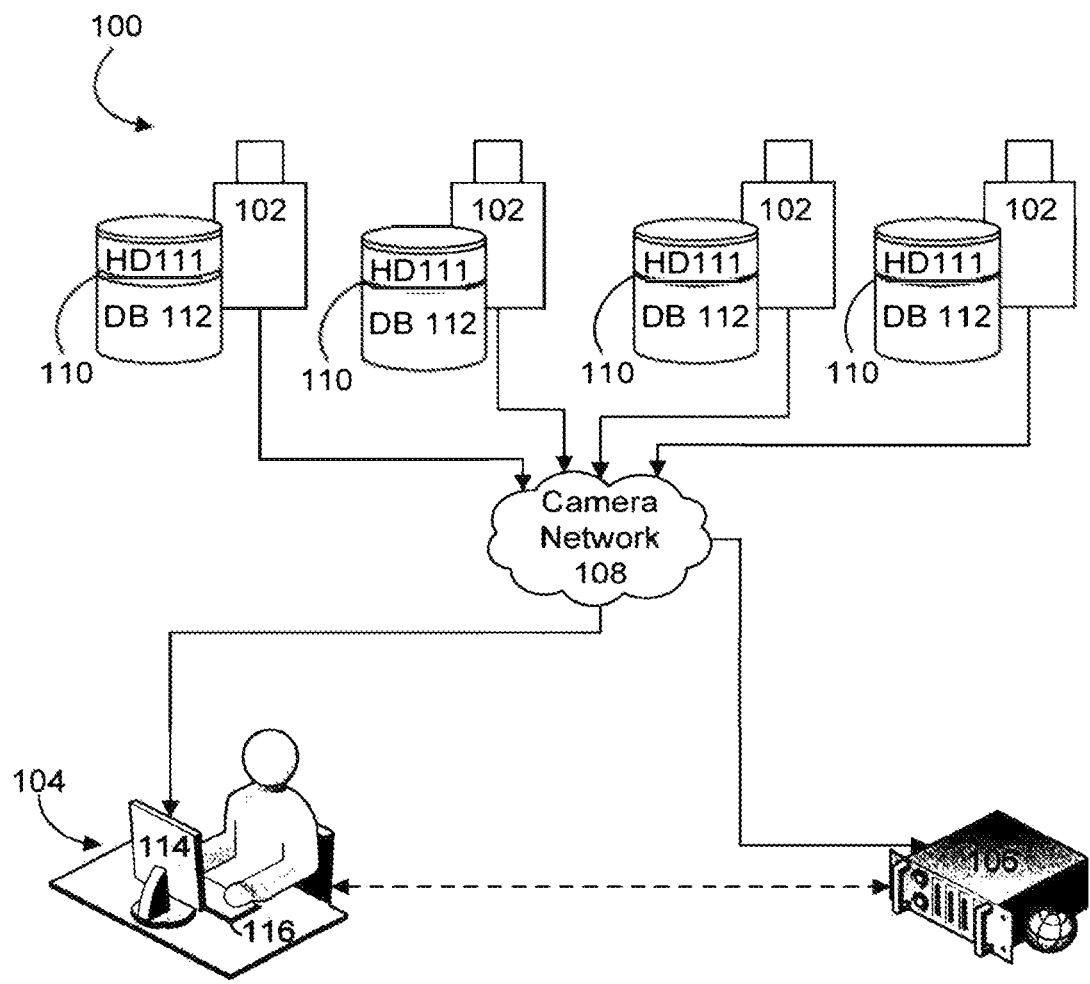
FIG. 1 is a pictorial diagram of a camera system according to one embodiment.

With reference to the above-listed drawings, this section describes particular embodiments and their detailed construction and operation. The embodiments described herein are set forth by way of illustration only and not limitation. Those skilled in the art will recognize in light of the teachings herein that there is a range of equivalents to the example embodiments described herein. Most notably, other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Overview

As one skilled in the art will appreciate in light of this disclosure, certain embodiments are capable of achieving certain advantages over the known prior art, including perhaps some or all of the following: (1) improved object classification accuracy; (2) utilization of user feedback for training and adaptation of an object classifier, (3) learning new object classes in a field-deployed camera system; (4) online evaluation and deployment of new object classifiers; (5) gathering feedback from a community of camera systems to train new and/or more accurate general object classifiers; (6) calibrating a field-deployed camera system during live operation; (7) reduction, or even elimination, of the need for manual calibration of systems in the field during installation and tuning of the systems thereafter due to seasonal changes or camera movement; and (8) automatic adaptation of the camera system to changing conditions. These and other advantages of various embodiments will be apparent upon reading the remainder of this document According to an embodiment, a camera system comprises video analytics for processing image data representing an image of a field of view projected on an image plane of an image capturing device, the video analytics comprising: an object classification module including an object classifier that is operable to classify objects captured in the field of view based on the image data, wherein the object classifier is operable to classify objects as members or non-members of an object class; and a calibration module connected to the object classification module for estimating representative sizes of members of the object class, the representative sizes corresponding to different regions of the image plane, wherein the calibration module is operable to automatically update the representative sizes in response to classifications performed by the object classifier during in-field operation, and the calibration module is operable to supply information representing the updated representative sizes to the object classifier to improve its object classification performance.

According to another embodiment, a method of automatically calibrating a camera system, the method comprises: receiving image data representing an image of a scene, the image corresponding to an image plane on which the scene is projected; detecting a first object in the image, an image of the first object being detected at a location of the image plane, and the image of the first object having a size corresponding to the location; classifying the first object as a first member of an object class; calculating a parameter of a size function for the image plane based on the size of the first object; and updating the parameter of the size function in response to detection and classification of a second member of the object class.

According to another embodiment, a camera system comprises video analytics for processing image data representing an image of a field of view projected on an image plane of an image capturing device, the video analytics comprising: an object classification module including an object classifier that is operable to classify objects captured in the field of view based on the image data, wherein the object classifier is operable to classify objects as members or non-members of an object class; and a calibration module connected to the object classification module for estimating representative sizes of members of the object class, the representative sizes corresponding to different regions of the image plane, wherein the calibration module is operable to automatically update the representative sizes in response to classifications performed by the object classifier during in-field operation, a confidence parameter is associated with classifications of objects by the classification module, and the confidence parameter is determined at least in part based on the representative size of the associated object.

Additional aspects and details of the construction and operation of the foregoing embodiments and other embodiments are set forth in the following subsections with reference to the accompanying drawings.

Overall System

FIG. 1 is a pictorial diagram of a camera system 100 according to one embodiment. The camera system 100 includes image capturing devices 102, a user interface 104, and a remote storage/processing unit 106 connected to each other in a network 108. The network 108 may include any type of wired or wireless network. Although the camera system 100 of FIG. 1 includes multiple image capturing devices 102 connected in a network, the camera system 100 may include a single image capturing device 102. The image capturing devices 102 may include an internal storage system 110, comprising a hard drive (HD) 111 and a metadata database (DB) 112. For example, the image capturing devices 102 may include a storage system described in commonly owned U.S. patent application Ser. Nos. 12/105,971 and 12/105,893, entitled "Content Aware Storage of Video Data" and "Extending the Operational Lifetime of a Hard-Disk Drive Used in Video Data Storage Applications," respectively, both of which are incorporated herein by reference in their entireties. The user interface 104 includes a display 114 and an input device 116. Image capturing devices 102 capture images of their respective fields of view and generate image data representing the images. It is to be understood that images may refer to still images or motion video images. The image data is communicated over the network 108 to the user interface 104, and images of one or more of the fields of view are presented on the display 114. The input device 116 is operable to allow a user to provide user feedback information for the camera system 100. Image data may also be communicated over the network 108 to the remote storage/processing unit 106, where the storage system(s) 110 or parts thereof or similar storage systems may alternatively or additionally be located.

Figure 2:
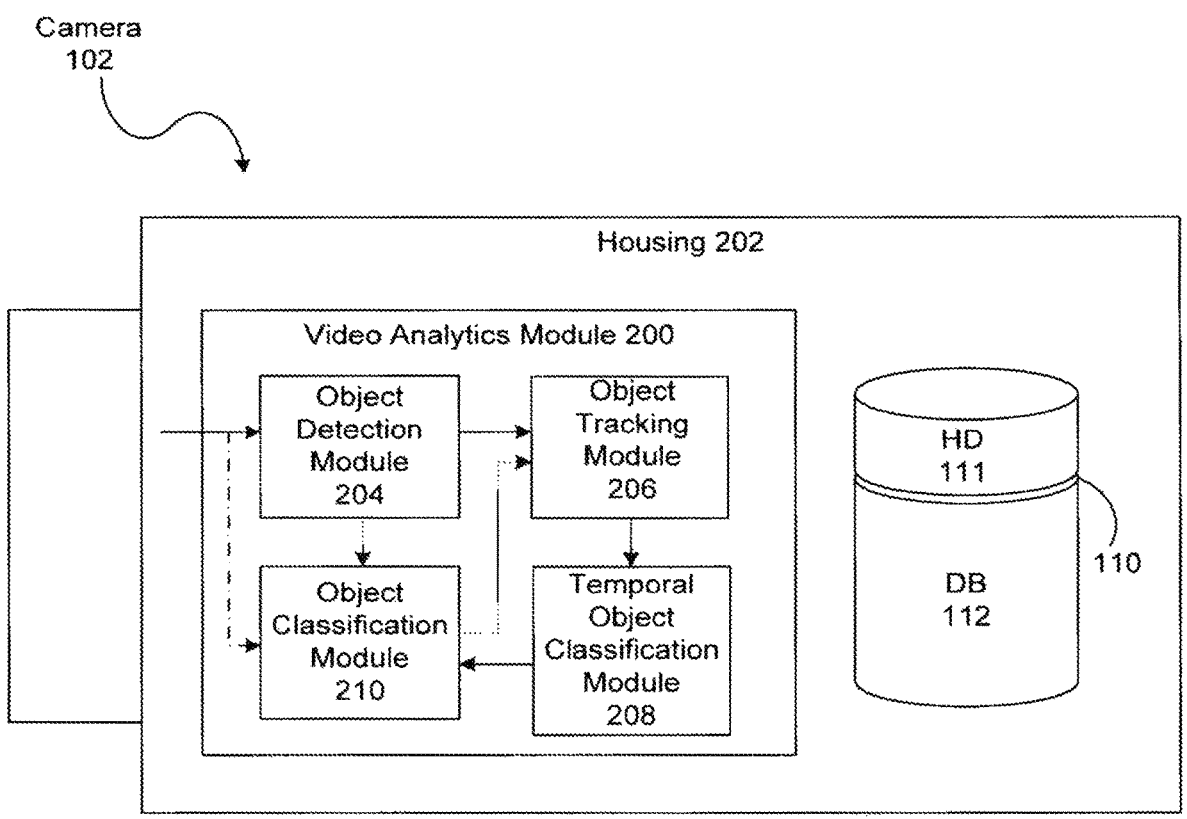
FIG. 2 is a simplified block diagram of one of the image capturing devices in the system shown in FIG. 1.

FIG. 2 is a simplified block diagram of one of the image capturing devices 102. The image capturing device 102 may be a high-resolution video camera such as a megapixel video camera. The image capturing device 102 may also capture data from outside the visible spectrum (e.g., thermal energy). In addition to the storage system 110, the image capturing device 102 includes an image processing unit that includes a video analytics module 200 for analyzing images captured by the image capturing device 102. Data generated by the video analytics module 200 may be used by a rules engine (not shown) to determine whether or not one or more user-specified rules have been violated. For example, the rules engine may trigger an alarm that is presented on the display 114 of the user interface 104 if a human is detected in the field of view of one of the image capturing devices 102. The image processing unit need not be contained within a housing 202 of the image capturing device 102 as depicted in FIG. 2. Moreover, the remote storage/processing unit 106 may also include an image processing unit.

The video analytics module 200 includes a number of modules for performing various tasks. For example, the video analytics module 200 includes an object detection module 204 for detecting objects appearing in the field of view of the image capturing device 102. The input to the object detection module 204 is video data, preferably live video data from an imager (not shown) or video buffer memory (not shown). The object detection module 204 may employ any known object detection method such as motion detection and blob detection, for example. The object detection module 204 may include the systems and use the detection methods described in commonly owned U.S. patent application Ser. No. 10/884,486, now U.S. Pat. No. 7,627,171, entitled "Methods and Systems for Detecting Objects of Interest in Spatio-Temporal Signals," the entire contents of which are incorporated herein by reference.

The video analytics module 200 also includes an object tracking module 206 connected to the object detection module 204. As used herein, the term "connected" means logically or physically connected directly or indirectly through one or more intermediaries. The object tracking module 206 is operable to temporally associate instances of an object detected by the object detection module 204. The object tracking module 206 may include the systems and use the methods described in commonly owned U.S. patent application Ser. No. 12/397,276, now U.S. Pat. No. 8,224,029, entitled "Object Matching for Tracking, Indexing, and Search," the entire contents of which are incorporated herein by reference. The object tracking module 206 generates metadata corresponding to objects it tracks. The metadata may correspond to signatures of the object representing the objects' appearance or other features. The metadata may be transmitted to the metadata database 112 for storage.

The video analytics module 200 also includes a temporal object classification module 208 connected to the object tracking module 206. The temporal object classification module 208 is operable to classify an object according to its type (e.g., human, vehicle, animal) by considering the object's appearance over time. In other words, the object tracking module 206 tracks an object for multiple frames (i.e., multiple images), and the temporal object classification module 208 determines the object's type based upon its appearance in the multiple frames. For example, gait analysis of the way a person walks can be useful to classify a person, or analysis of a person's legs can be useful to classify a bicycler. The temporal object classification module 208 may combine information regarding the trajectory of an object (e.g., whether the trajectory is smooth or chaotic, whether the object is moving or motionless) and the confidence of classifications made by an object classification module 210 (described in detail below) averaged over multiple frames. For example, classification confidence values determined by the object classification module 210 may be adjusted based on the smoothness of trajectory of the object. The temporal object classification module 208 may assign an object to an unknown class until the object is classified by the object classification module a sufficient number of times and a predetermined number of statistics have been gathered. In classifying an object, the temporal object classification module 208 may also take into account how long the object has been in the field of view. The temporal object classification module may make a final determination about the class of an object based on the information described above. The temporal object classification module 208 may also use a hysteresis approach for changing the class of an object. More specifically, a threshold may be set for transitioning the classification of an object from unknown to a definite class, and that threshold may be larger than a threshold for the opposite transition (e.g., from a human to unknown). The temporal object classification module 208 may generate metadata related to the class of an object, and the metadata may be stored in the metadata database 112. The temporal object classification module 208 may aggregate the classifications made by the object classification module 210.

Object Classification

The video analytics module 200 also includes the object classification module 210, preferably connected to the object detection module 204 directly or indirectly. In contrast to the temporal object classification module 208, the object classification module 210 may determine an object's type based upon a single instance (i.e., single image) of the object. The input to the object classification module 208 is preferably objects, rather than video or image data. A benefit of inputting objects to the object classification module 208 is that the whole scene need not be analyzed for classification, thereby requiring less processing power. Other preliminary modules, such as heuristics-based modules to catch obvious classifications, can also be included to further simplify the complexity of the object classification module 210.

The object detection, tracking, and temporal classification modules 204, 206 and 208 are optional but preferred components of the video analytics module 200. In an alternative arrangement, the object classification module 210 is placed after the object detection module 210 and before the object tracking module 206 so that object classification occurs before object tracking. In another alternative arrangement, the object detection, tracking, temporal classification, and classification modules 204-210 are interrelated as described in the above-referenced U.S. patent application Ser. No. 10/884,486.

Figure 3:
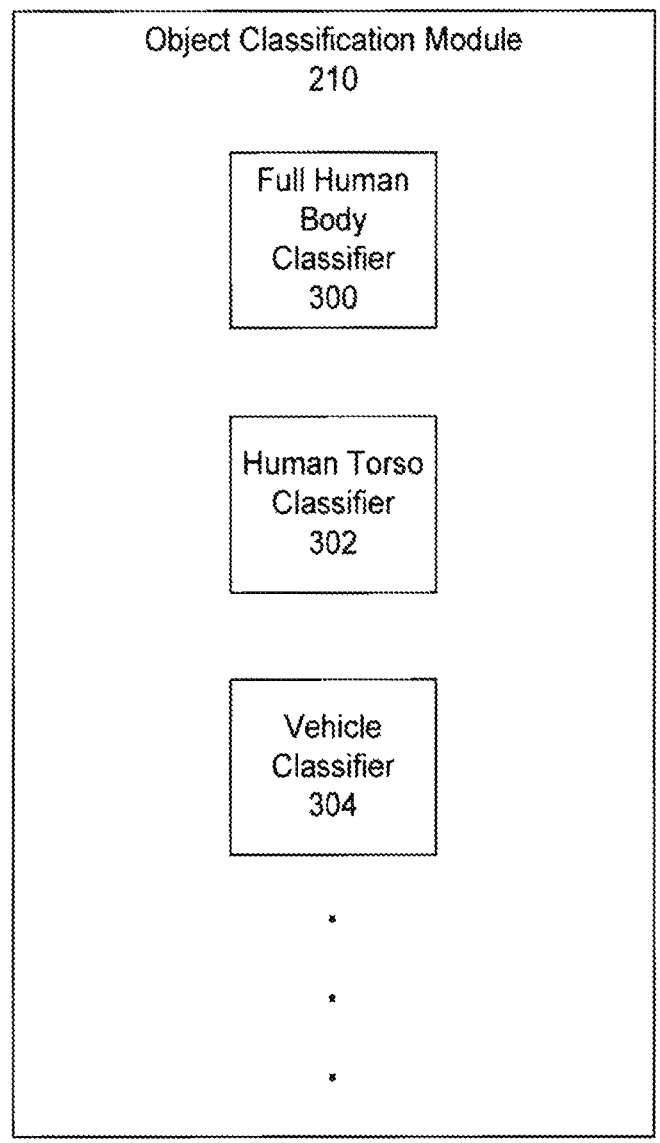
FIG. 3 is a block diagram of the object classification module shown in FIG. 2.

The object classification module 210 includes a number of object classifiers as depicted in the block diagram of FIG. 3. For example, the object classification module 210 may include a full human body classifier 300 that determines whether an image of a detected object corresponds to a full human body, a human torso classifier 302 that determines whether an image of a detected object corresponds to a human torso, and a vehicle classifier 304 that determines whether an image of a detected object corresponds to a vehicle. The object classification module 210 may include any number of different classifiers, and, as described in more detail below, a user may create new classes of objects for the object classification module 210 even when the camera system is deployed and functioning. In other words, the object classification module 210 is field trainable.

The object classifiers are operable to classify an object based upon the object's features (e.g., appearance characteristics). For example, the full human body classifier 300 receives data (i.e., an input pattern X) corresponding to an object's features and determines whether the object corresponds to a full human body or not. After the object classification module 210 classifies an object, metadata representing the class of the object and the features of the object may be stored in the metadata database 112.

Features that can be used by the object classification module 210 will now be described in greater detail. A training algorithm, described below, chooses a subset of features $P=\{f_{k1}, f_{k2}, \ldots f_{km}\}$ from a set of features $F=\{f_1, f_2, \ldots, f_n\}$. The input pattern X is made up of the elements of P. The elements of P may be viewed as some transformation of an image region R of an object. Thus, X may take on the following form:

$$X = \begin{Bmatrix} \hat{f}_1 = f_{k1}(R) \\ \hat{f}_2 = f_{k2}(R) \\ \vdots \\ \hat{f}_m = f_{km}(R) \end{Bmatrix} \quad (1)$$

The features $\hat{f}_1, \hat{f}_2, \ldots, \hat{f}_n$ of an object may correspond to a number of appearance characteristics such as, but not limited to, aspect ratio, color, edge orientations, and normalized saturation. Moreover, the features $\hat{f}_1, \hat{f}_2, \ldots, \hat{f}_m$ may represent feature vectors (e.g., histograms in which the histogram bins correspond to vector components) of the appearance characteristics and may be used by one or more object classifiers to determine the object's class (i.e., type). For example, histograms of the edge orientations of an object may be constructed for different regions (e.g., subwindows) of the object's image. In other words, an image of an object may be divided into subwindows, and edge orientations may be calculated for each pixel of the subwindows. The edge orientation of a pixel may be derived using a steerable filter (e.g., using a Gaussian derivative filter in multiple directions). Using a steerable filter allows dominant directions to be assigned to the pixels of a subwindow, and allows a histogram of the directions to be constructed for the subwindow. For example, for a given pixel, a steerable filter may be used in multiple directions to generate multiple responses, and the direction corresponding to the maximum directional derivative response is assigned as the direction of the pixel.

The classification problem for one of the object classifiers may be defined generally by a classifier function $\Gamma(X)$, in which an object represented by the input pattern X is declared a member of the object class when $\Gamma(X)>0$ or as a non-member of the object class when $\Gamma(X)<0$. Generally the classifier function $\Gamma(X)$ is parameterized with a set of parameters and the input pattern X is composed of the features described above. A specific classifier $\Gamma_c(X)$ is trained for each object class of interest. The multi-class classification model represented by the object classification module 210 of FIG. 3 may be mathematically defined as follows:

$$\Omega=\{\omega_1,\omega_2,\ldots \omega_c,\}$$

$$\omega=\omega_c:(\Gamma_c(X)>0 \text{ and } \Gamma_c(X)>\Gamma_u(X)\forall u\in(1,2,\ldots,C), u\neq c) \quad (2)$$

where $\omega$ represents an object class, and $\Omega$ represents the set of all object classes.

Figure 4:
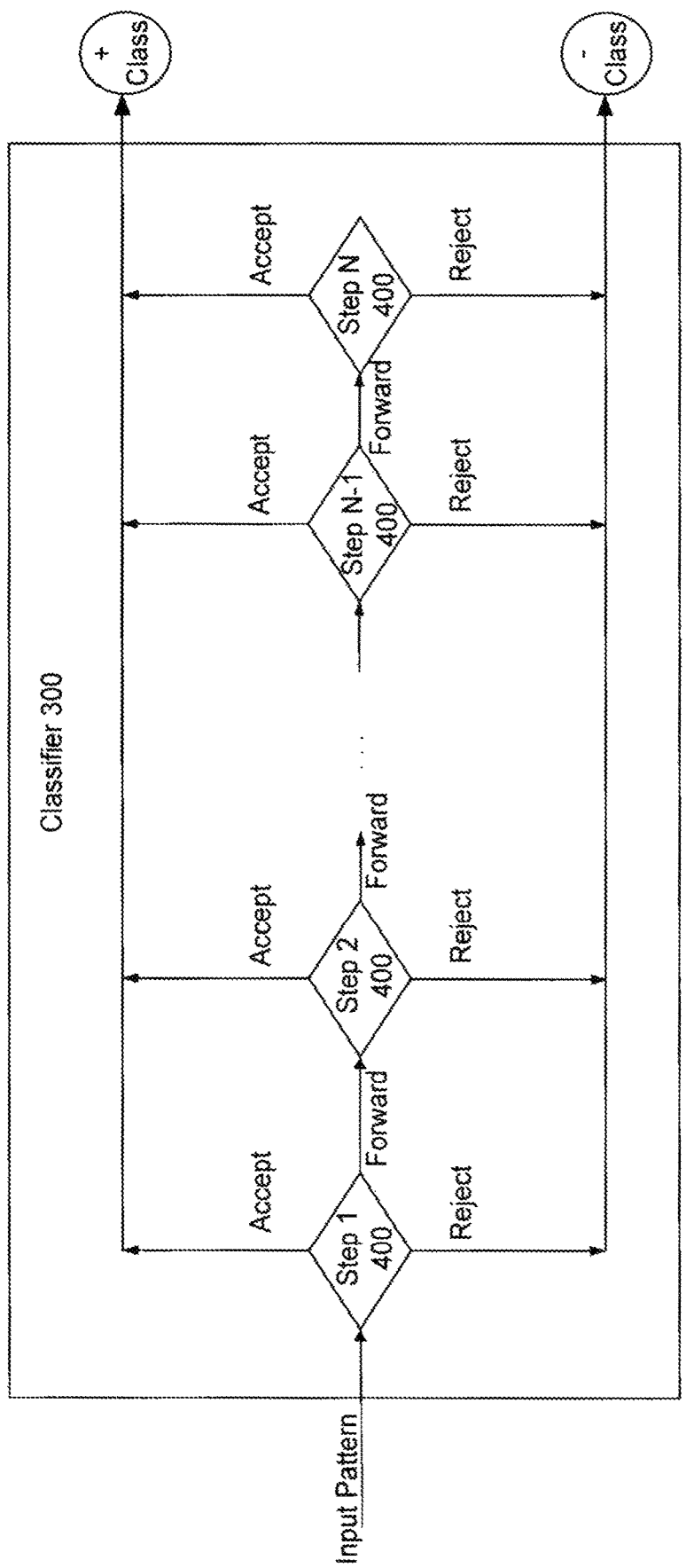
FIG. 4 is a block diagram of one of the classifiers of FIG. 3.

An example of one structure of the object classification module 210 will now be described in more detail with reference to FIGS. 4-6. For sake of clarity, the full human classifier body 300 will be described in detail. The following description, however, is equally applicable to the other object classifiers of the object classification module 210. The classifier 300 includes multiple steps 400 (N decision steps) configured in a cascade configuration (i.e., step 1, followed by step 2, followed by step 3, . . . , followed by step N) as shown in FIG. 4. The N steps operate to determine whether or not an object's appearance corresponds to the object class (i.e., full human body). Unlike a known cascade classification system proposed in Paul Viola & Michael Jones, "Robust Real-Time Face Detection," International Journal of Computer Vision, pp. 137-154 (2004), in which an object is either rejected or forwarded in the N−1 initial steps (i.e., all but the final step), each of the initial N−1 steps of the classifier 300 is operable to make one of three decisions: (1) accept the object as a member of the object class (i.e., positive class), (2) reject the object as a member of the object class (i.e., negative class), and (3) forward the decision onto the next step. For example, the input pattern X of an object is supplied to step 1, and step 1 decides whether to (1) accept the object as a full human body, (2) reject the object as a full human body, or (3) forward the input pattern X to step 2 to make the determination. The decision to accept, reject or forward is based on a value produced by the step (i.e., a decision step value). The final or $N^{th}$ step is operable to either (1) accept the object as a full human body or (2) reject the object as full human body.

Figure 5A:
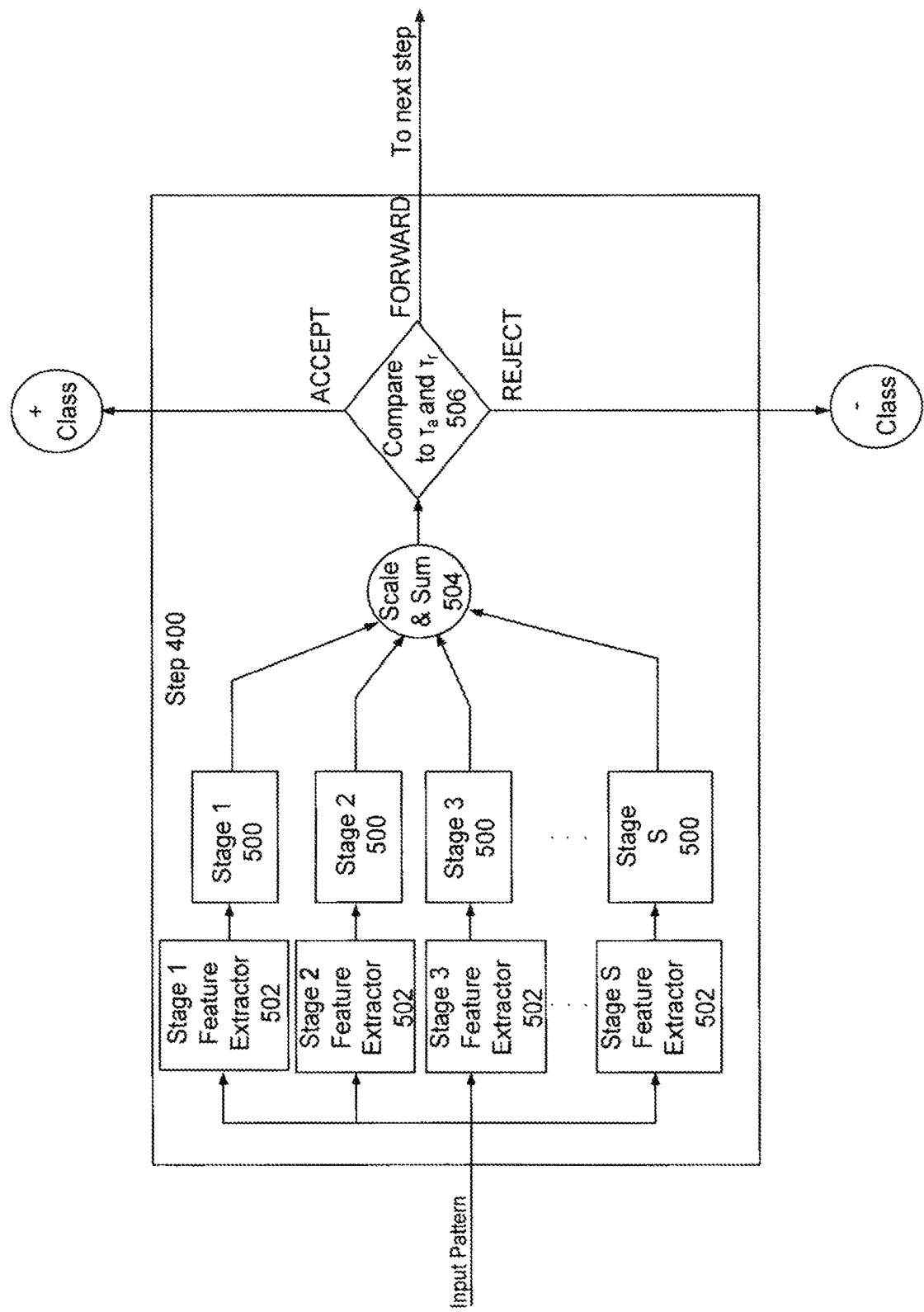
FIG. 5A is a block diagram showing one of the initial N−1 steps in the classifier shown in FIG. 4.

FIG. 5A is a block diagram showing one of the initial N−1 steps 400 in more detail. Each step 400 includes one or more stages 500. For each of the stages 500, one of the features $\hat{f}_1, \hat{f}_2, \ldots, \hat{f}_m$ is extracted (represented by blocks 502) from the input pattern X and supplied to its corresponding stage 500. Each stage 500, therefore, has a corresponding feature associated with it. The stage/feature combination may be predetermined by a learning algorithm during a training process as described below. Moreover, a feature supplied to the first stage (stage 1) of FIG. 5, for example, may be different from or the same as the feature supplied to the second stage (stage 2).

In general, a stage 500 may be represented by a stage function g which is defined as follows:

$$g:x\rightarrow\gamma \text{ where}$$

$$g\in G$$

$$x\in X \text{ and}$$

$$\gamma\in[-1,1] \quad (3)$$

in which G represents a general set from which the specific stage function g is chosen and x represents an arbitrary input to the stage. The set G may be a rich family of functions mapping a feature set to a scalar value whose sign indicates the class of an object. As described above, each stage 500 receives as an input one of the features $\hat{f}_1, \hat{f}_2, \ldots, \hat{f}_m$. The set G may, therefore, be written as G=F×T where F is defined above and T represents a set of possible transformations (i.e., mappings) such that for $t\in T$, $\hat{f}_i\rightarrow\gamma$. Thus, the stage function g may take on the following expanded form:

$$g_i(x)=t(\hat{f}_k), \hat{f}_k\in F \quad (4)$$

A stage 500 represents a discriminant function that includes a weight vector $\vec{w}$ and an activation function $\beta$. As noted above, the features $\hat{f}_1, \hat{f}_2, \ldots, \hat{f}_m$ may represent feature vectors. The stage function may be rewritten as follows:

$$g_i(x)=\beta_i(\vec{w}_i \cdot \hat{f}_k) \quad (5)$$

where $\hat{w}_i \cdot \hat{f}_k$ represents the inner product of the weight vector $\vec{w}_i$ and the feature vector $\hat{f}_k$. The activation function $\beta_i$ may be any function such as, but not limited to, a sigmoid function or a radial basis function. The activation function $\beta_i$ is used to map the inner product of the weight vector $\vec{w}_i$ and the feature vector $\vec{f}_k$ to a value between zero and one. The scalar value $\gamma$ may be determined by calculating a differential of the discriminant function. Unlike known cascade classifiers that include the same discriminant function for all stages, the discriminant functions for the stages of the present embodiment may be different from each other. Moreover, the weight vector $\vec{w}_i$ and activation function $\beta_i$ for each stage 500 are automatically determined during training as described below.

Each step 400 is a linear combination (represented by scale and summing block 504) of one or more of the stages 500. In other words, the scalar values $\gamma$ of the stages 500 are scaled and summed to produce the decision step value s(X). In general, this function may be represented mathematically as follows:

$$s(X)=\Sigma_{\in_i}\alpha_i g_i(x)$$

$$\text{where } \Sigma_{\forall_i}\alpha_i=1 \quad (6)$$

Because s(X) (i.e., the decision step value) is a convex combination of stages, s(X) and g(x) have the same range. Weighting coefficients $\alpha$ are chosen by a learning algorithm during training. The decision step value is compared (represented by block 506) to one or both of an acceptance threshold $\tau_a$ and a rejection threshold $\tau_r$ to determine whether to accept the object as a full human body, to reject the object as a full human body, or to forward the decision to the next step 400. The comparison may be represented as follows:

Accept if $\tau_a < s(X) \leq 1$

Forward if $\tau_r < s(X) \leq \tau_a$

Reject if $-1 \leq s(X) \leq \tau_r$ (7)

Figure 5B:
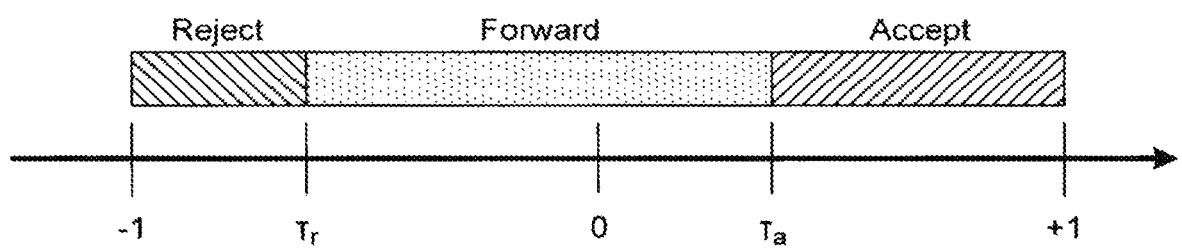
FIG. 5B is a depiction of acceptance and rejection thresholds utilized in the step shown in FIG. 5A.

FIG. 5B illustrates one example of the acceptance and rejection thresholds in the interval [−1,+1]. The acceptance threshold $\tau_a$ and the rejection threshold $\tau_r$ are chosen during training by a learning algorithm based on user-specific false positive and false negative rates. Each step 400 may have values for $\tau_a$ and $\tau_r$ that are different from or the same as the other steps 400. A decision to "Accept" implies that the classifier is confident that input pattern X belongs to the positive class (e.g., a full human body). A decision to "Forward" implies that the classifier is unsure and defers the decision to the next step. A decision to "Reject" implies that the classifier is confident that the input pattern X belongs to the negative class (e.g., not a full human body). At any step, if the decision is not to "Forward" to the next step 400, the accept/reject decision is made at that point and the evaluation is complete. The decision step value may correspond to a decision confidence level for the corresponding step 400. For example, a decision step value close to one may represent that the corresponding step 400 is more confident that an object is a full human body compared to a decision step value slightly above the acceptance threshold $\tau_a$. Alternatively, an increase in the decision step value may not necessarily correspond to a higher decision confidence level (i.e., a probability that the decision was correct). The confidence level associated with each decision step value may be empirically estimated during training as objects are correctly and incorrectly classified with different decision step values. The confidence levels of the decision step values is described in more detail below. As noted above, the final stage (stage N) in the classifier is forced to always accept or reject:

Accept if $0 < s(X) \leq 1$

Reject if $-1 \leq s(X) \leq 0$ (8)

Figure 6:
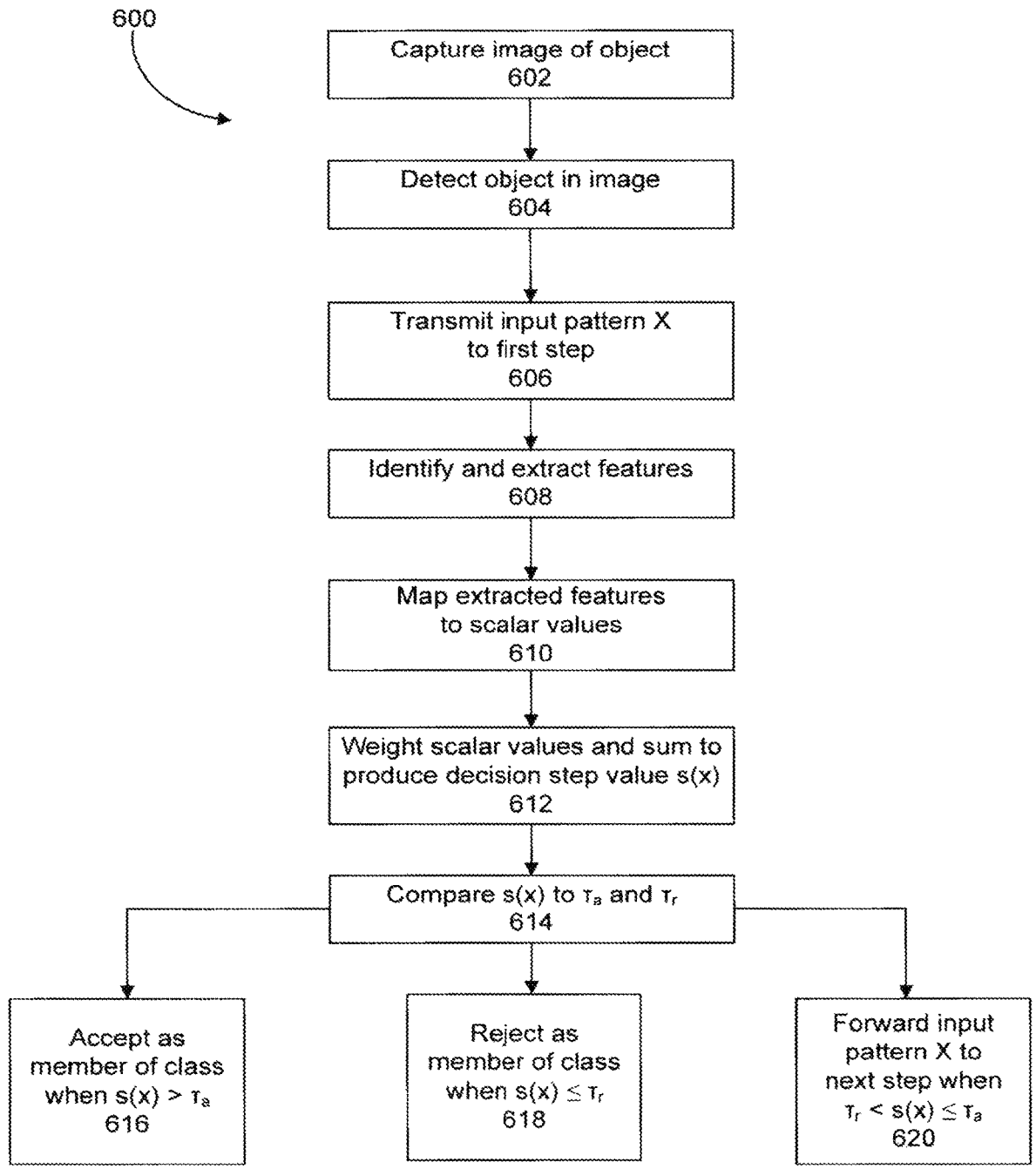
FIG. 6 is a flowchart depicting a method of utilizing a camera system, according to one embodiment.

FIG. 6 is a flowchart depicting a method 600 of utilizing a camera system, according to one embodiment. The method 600 will be described with reference to the camera system 100 by way of example only; the method 600 is operable with any suitable camera system. First, an image of an object is captured by one of the image capturing devices 102 (step 602). The object is detected by the object detection module 204 (step 604). The input pattern X is transmitted to the first step 400 of, for example, the full human body classifier 300 (step 606). Alternatively, rather than transmitting the pattern X to the first step 400, the combined features used by the stages 500 of the first step 400 may be selected and only those features may be transmitted to the first step 400. The features for the first through $5^{th}$ stages 500 are identified in and chosen from the input pattern X (step 608). The chosen features are supplied to their respective stages 500, and the stages 500 map the chosen features to scalar values (step 610). The scalar values are scaled (i.e., weighted) and summed to produce a decision step value s(X) (step 612). The decision step value is compared to one or more of the acceptance threshold $\tau_a$ and the rejection threshold $\tau_r$ (step 614). If the decision step value is greater than the acceptance threshold $\tau_a$, the object is accepted as a member of the object class (e.g., accepted as a full human body) (step 616). If the decision step value is less than or equal to the rejection threshold $\tau_r$, the object is rejected as a member of the object class (e.g., rejected as a full human body) (step 618). If the decision step value is greater than the rejection threshold $\tau_r$, but less than or equal to the acceptance threshold $\tau_a$, the input pattern X is forwarded to the second step 400 (or, in the alternative, only those feature combinations used by the second step 400 are transmitted to the second step 400) (step 620). An object may be accepted or rejected as a member of the object class at any step 400 within the cascade.

The input pattern X may be supplied simultaneously to all of the classifiers of the object classification module 210 in which each classifier either accepts or rejects the object as a member of its corresponding class. If more than one object classifier accepts the object as a member of its class, the output of the object classifiers decision step values of the object classifiers that accepted the object may be compared. For example, the fully human body classifier 300 and the vehicle classifier 304 may determine that an object is, respectively, a full human body and a vehicle. In that case, the decision step values produced by the steps that accepted the object may be compared, and the object may be assigned the class corresponding to the classifier with the most confident (e.g., largest) decision step value. For example, if the decision step value of the full human classifier corresponds to a 90% confidence level, and the decision step value of the vehicle classifier corresponds to a 80% confidence level, the object is classified as a full human body. If none of the classifiers declare a positive output (the object is not accepted as a member of any class), then the object may be classified as being unknown.

Figure 7:
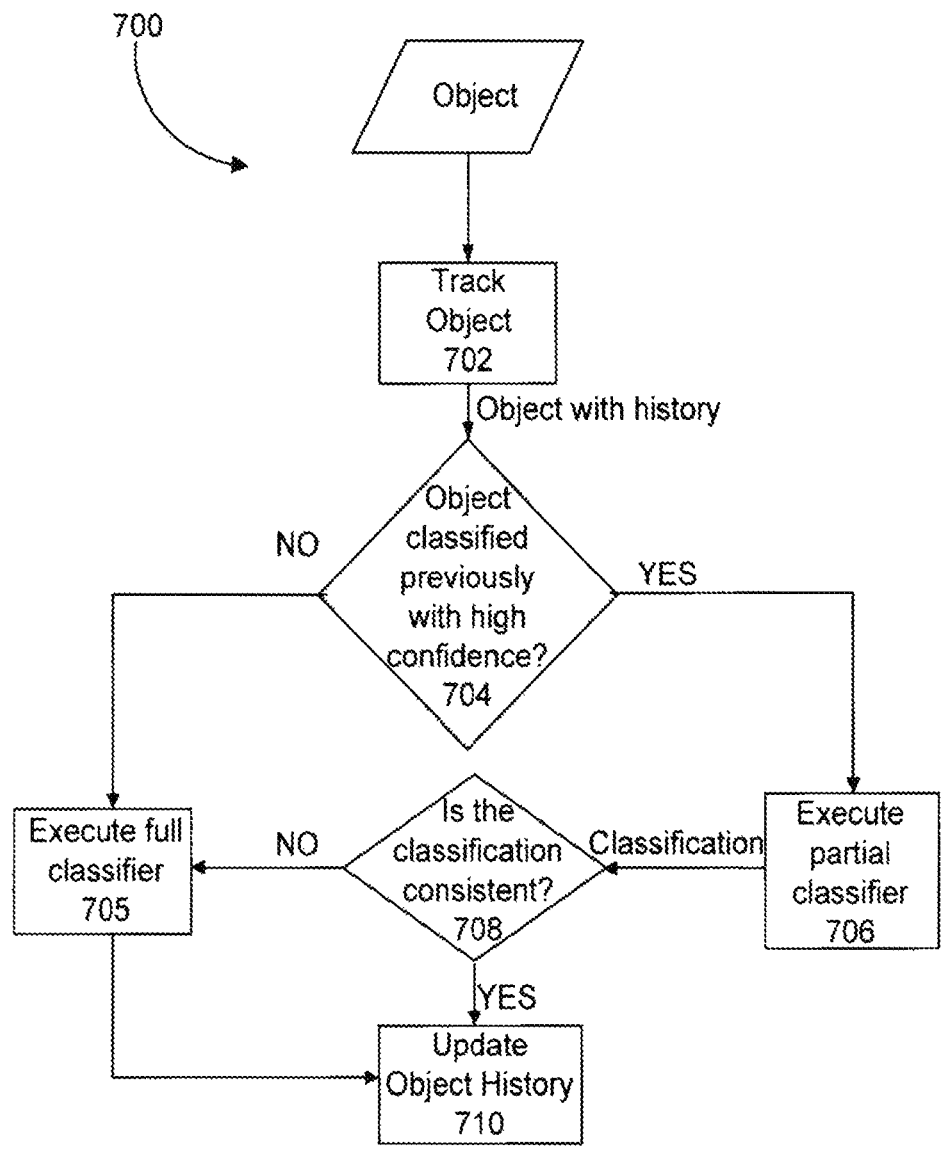
FIG. 7 is a flow diagram showing an object tracking method.

Tracking, such as performed by the object tracking module 206, may be taken into consideration when the object classification module 210 determines the class of an object. FIG. 7 is a flow diagram showing an object tracking method 700. The method 700 will be described with reference to the object tracking module 206 used in conjunction with the object classification module 210, by way of example only. The method 700 is operable with any suitable system. The method 700 associates an image of an object with a previous instance of the object (block 702). The method 700 recalls the class and the classification confidence level related to the previous instance of the object. The object classification module 210 determines whether the object was previously classified with high confidence (block 704). Confidence levels that are considered high confidence may be predetermined by a user (e.g., 70% confidence or above). If the object classification module determines that the object was not previously classified with high confidence, then multiple object classifiers are executed (block 705). If the method 700 determines that the object was previously classified with high confidence, a part of the classifier corresponding to the object's previously declared class may be executed (block 706) rather than executing multiple classifiers. For example, only the first step 400 of the classifier corresponding to the previously declared class may be evaluated. The output of the first step 400 may be checked to see if it is consistent with the previously declared class (block 708). If the output of the first step 400 is consistent with the previously declared class, no further evaluation is needed; the object's class for the current image is determined, and the object's history is updated and stored in the metadata database 112 (block 710). If, on the other hand, the decision of the first step 400 is to reject the object as a member of the object class, then one or more of the other object classifiers are executed (block 705). If the output of the first step 400 is to forward, one or more of the other steps 400 may be evaluated until the output is consistent or inconsistent with the previously declared class.

Training the Object Classifiers

A method of training the object classifiers of the object classification module 210 will now be described. Conventional classification systems may be trained with the learning algorithm AdaBoost or some variant of AdaBoost. While AdaBoost has proved its worth in some applications, the algorithm and objective function used in that learning process have some limitations. For example, for AdaBoost to be effective, members and nonmembers of an object class cannot overlap each other significantly in feature space. In other words, the features of the objects should separate a classification space well. Moreover, because AdaBoost uses weak learners, a large collection of weak learners may be necessary to form a full classifier capable of achieving a desired accuracy.

According to one embodiment, an alternative objective function and learning algorithm called Sequential Discriminant Error Minimization (SDEM) is preferably used to train the object classifiers of the object classification module 210. SDEM was proposed in Saptharishi, "Sequential Discriminant Error Minimization: The Theory and its Application to Real-Time Video Object Recognition," (Carnegie Mellon University, 2005), the entire contents of which are incorporated herein by reference. SDEM can deal with features that do not necessarily separate a classification space well. Unlike AdaBoost and other similar boosting techniques, SDEM may use weak learners or other discriminant functions that are not necessarily considered weak. Thus, the number of steps 400 and stages 500 of an object classifier may be significantly less using SDEM for training compared to AdaBoost. For a given feature, SDEM is often capable of learning the best classifier for the corresponding feature space. The best features of objects may be automatically selected for a given classification problem.

Generally, the SDEM algorithm is used to train the combination of stages 500 for each step 400. As defined in equation (4), a stage 500 includes a stage $g_i(x)$ that is equal to a transformation t of a feature $f_k$. The training task chooses the best transformation t, along with the best feature h, such that when a particular stage 500 is added to a step 400, the performance of the object classifier is maximized. In other words, the SDEM algorithm selects the transformation t and the feature $f_k$ for a particular stage so as to maximize an objective function. The set F of features may be finite, and the set T of transformations may be continuous and differentiable. Following the SDEM algorithm, for each choice of h, a search is performed in the set T to identify the transformation t that performs best on a training data set. The search in the set T may be performed using standard unconstrained optimization techniques, such as, but not limited to, a Quasi-Newton optimization method. Once the best transformation t is identified for each choice of $\hat{f}_k$, the best feature may be selected according to an estimated generalization error $\hat{\epsilon}(g)$. Selection of the best feature may be written as follows:

$$g_i(x) = \min_{\forall \hat{f}_j \in F, \forall t \in T} \{\hat{\epsilon}(t(\hat{f}_j))\} \quad (9)$$

One of the properties of the SDEM algorithm is that when a stage 500 is added to a step 400, the addition of the stage 500 improves the performance of the object classifier on the training data set. If a new stage cannot be identified that improves the performance of the object classifier, the SDEM algorithm automatically terminates. Alternatively, rather than waiting for SDEM algorithm to automatically terminate, a number of stages 500 of a step 400 may be determined by a system designer. In other words, the SDEM algorithm terminates training when a maximum number of stages 500 set by the designer is reached or when no stage 500 can be added that will improve performance.

The SDEM algorithm selects a series of features/transformations such that when combined, the combination outperforms a single one of the features/transformations. For example, while the aspect ratio of an object might be a poor feature to use for classification alone, when combined with local gradient information, the aspect ratio may improve the classification accuracy corresponding to the local gradient information alone. A number of simple features and transformations may be combined to create a highly accurate object classifier. In effect, the training task creates superfeatures by combining a set of appearance features for an object.

Figure 8:
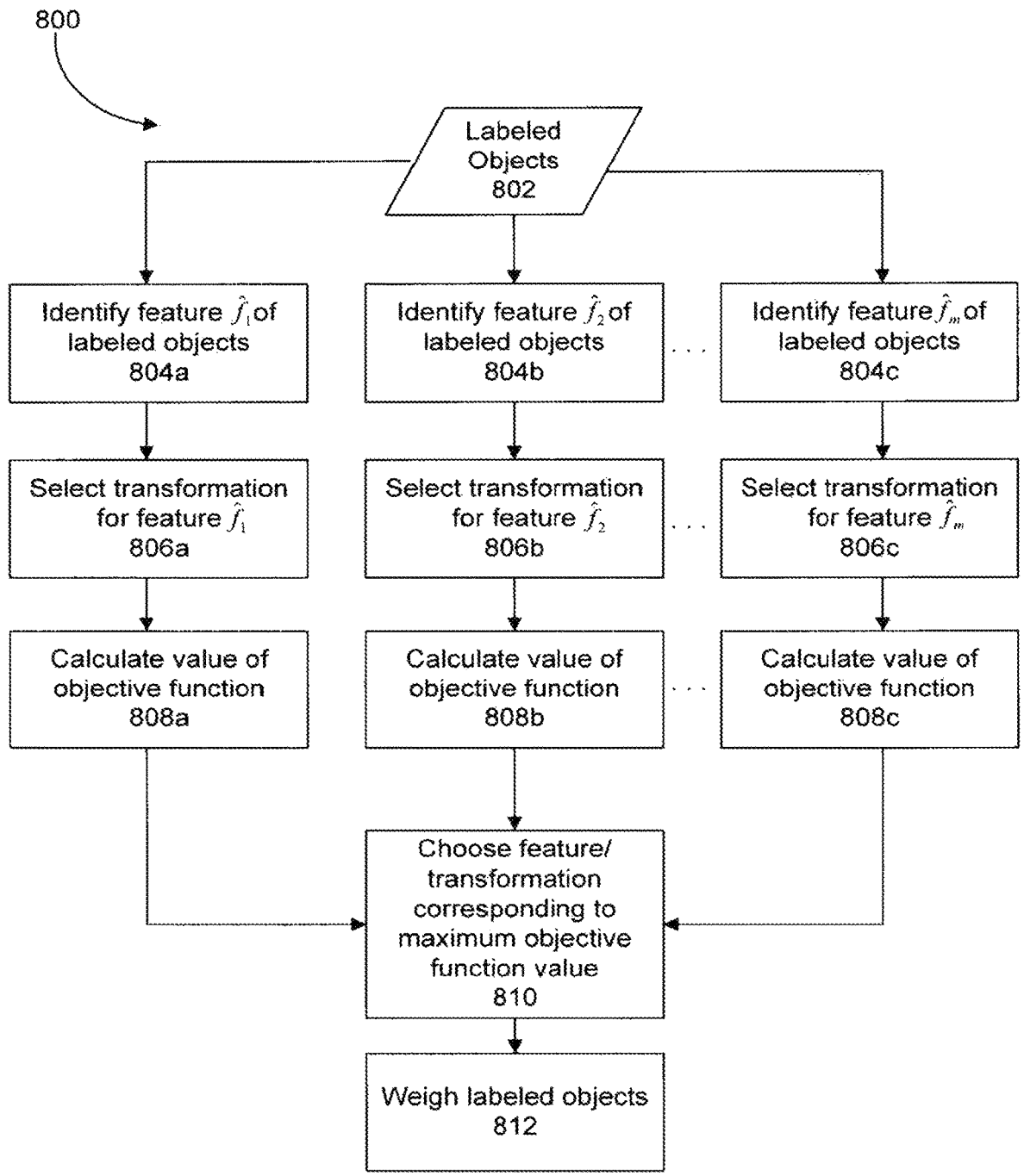
FIG. 8 is a flowchart of an object classifier training method.

A training method 800 for building the stages 500 of first step 400 will now be described in more detail with reference to the flowchart of FIG. 8. The following description is also applicable to the stages 500 of the other steps 400. The training data set for a classifier includes representations of members and non-members of the particular object class. For example, to train the full human body classifier 300, the training data set includes representations of images of full human bodies and images of other objects. The features $\hat{f}_1$, $\hat{f}_2$, ..., $\hat{f}_m$ of the objects may be extracted from the training data set. The objects of the training data set may be manually labeled by a user as either a member or non-member of the particular object class, resulting in labeled objects 802. The features $\hat{f}_1$, $\hat{f}_2$, ..., $\hat{f}_m$ of each labeled object 802 are identified and extracted (steps 804a, 804b, and 804c). Each feature $\hat{f}_1$, $\hat{f}_2$, ..., $\hat{f}_m$ is used to train a separate stage, and the stage that maximizes the value of the objective function is selected. Any number of features may be used. For example, of M (e.g., M=60) features, one may be an aspect ratio and the other M−1 features may be the vectors of size B that correspond to edge orientation histograms with B bins for M−1 different regions of an image of a labeled object.

After the features $\hat{f}_1$, $\hat{f}_2$, ..., $\hat{f}_m$ are extracted from the labeled objects 802, the best transformation t is selected for each of the features $\hat{f}_1$, $\hat{f}_2$, ..., $\hat{f}_m$ (steps 806a, 806b, and 806c). The transformations may be selected based on standard optimization techniques. A transformation t may be viewed as a decision boundary that separates the labeled objects in feature space. Thus, the best transformation t corresponds to a decision boundary that best separates the members and non-members of the object class. In the context of the discriminant function made up of the weight vector $\vec{w}_i$ and the activation function $\beta_i$, selection of the best transformation t corresponds to selection of the activation function $\beta_i$ and the components of the weight vector $\vec{w}_i$ that best separate the members and non-members of the object class. The activation function $\beta_i$ may be selected from a set of multiple function types such as, but not limited to, a sigmoid function and a radial basis function (e.g., a Gaussian function). Thus, unlike known cascade classifiers, a first stage may include a different type of discriminant function compared to a second stage.

After the transformations for the features $\hat{f}_1$, $\hat{f}_2$, ..., $\hat{f}_m$ are selected, a value of an objective function corresponding to each feature/transformation combination is calculated (steps 808a, 808b, and 808c). The objective function may be proportional to a measure of classification errors or it may be a nonlinear but monotonically varying function of the classification errors. The calculated values of the objective function may be related to the number and/or severity of classification errors made by the different feature/transformation combinations. For example, a first calculated value may be related to the number of classification errors made by the feature $\hat{f}_1$ and its corresponding transformation. The calculated values of the objective function are compared, and the feature/transformation combination that has the maximum calculated value is selected for the first stage 500 of the first step 400 (step 810).

After the feature and transformation are selected for the first stage 500, the labeled objects 802 are weighted with different weights taking into account the decisions made by the first stage 500 (step 812). The objects may be weighted as a function of how close their corresponding data points in feature space are to the decision boundary represented by the first stage 500. For example, the objects corresponding to data points close the decision boundary in feature space may be weighted with higher weights compared to objects with data points far away from the decision boundary so that a second stage 500 may be trained by focusing more on those objects that somewhat confused the first stage 500. The distance between a data point of an object and the decision boundary of the first stage 500 may be related to the scalar value y calculated for the object.

The training method 800 is repeated for the next stage. After the labeled objects are weighted, the best transformation is again selected for the features $\hat{f}_1, \hat{f}_2, \ldots, \hat{f}_m$ (steps 806a, 806b, and 806c are repeated). The features $\hat{f}_1, \hat{f}_2, \ldots, \hat{f}_m$, however, are now weighted, and the best transformation t for each of the features $\hat{f}_1, \hat{f}_2, \ldots, \hat{f}_m$ is selected taking into account the first stage 500. The best transformation t may correspond to the transformation that results in the greatest increase of the objective function value. The values of the objective function are again calculated and compared to determine the function/transformation for the second stage 500 (steps 808a, 808b, 808c, and 810 are repeated). To build a third stage 500, the labeled objects are re-weighted, in which the objects that were somewhat confusing to the first and second stages 500 are given higher weights. Again, steps 806a, 806b, and 806c are repeated, but the features $\hat{f}_1, \hat{f}_2, \ldots, \hat{f}_m$ are re-weighted and the best transformation t for each of the features $\hat{f}_1, \hat{f}_2, \ldots, \hat{f}_m$ is selected taking into account all the first and second stages 500. The values of the objective function are again calculated and compared to determine the function/transformation for the third stage 500 (steps 808a, 808b, 808c, and 810 are repeated). The process of choosing the best feature/transformation and weighting the labeled objects through each iteration of training a new stage may be thought of as a gradient ascent in function space, or as a process to increase the total value of the objective function.

Once the first step 400 is trained, the thresholds $\tau_a$ and $\tau_r$ such that desired false positive and false negative rates may be set. Moreover, as the stages 500 are constructed for the first step 400, the weighting coefficients $\alpha$ are also selected. For example, as each stage 500 is added to the first step 400, the weighting coefficients $\alpha$ for the stages are adjusted to find the values for the weighting coefficients $\alpha$ that correspond to the lowest overall error rate for the first step 400. For example, the weighting coefficients $\alpha$ may be selected by using a line search optimization strategy.

After the first step 400 is trained, the stages 500 of a second step 400 may be trained. The training data used to train the second step 400, however, is a subset of the training data set used to train the first step 400. The subset of training data corresponds to the labeled objects that the first step 400 could neither accept nor reject as a member of the object class. In other words, the second step 400 is trained with the labeled objects that had a corresponding decision step value greater than the rejection threshold $\tau_r$, but less than or equal to the acceptance threshold $\tau_a$. This allows the second step 400 to focus only on those objects that the first step 400 found confusing.

Because of the step-by-step progression of the training method 800, it should naturally determine the best order of the criteria in the N steps of the classifier 300 and result in the fewest steps needed to perform the classification. As a result, the classification performed in a deployed, trained field system should minimize both execution time required to output a classification and processing power needed to generate the classification.

Figure 9:
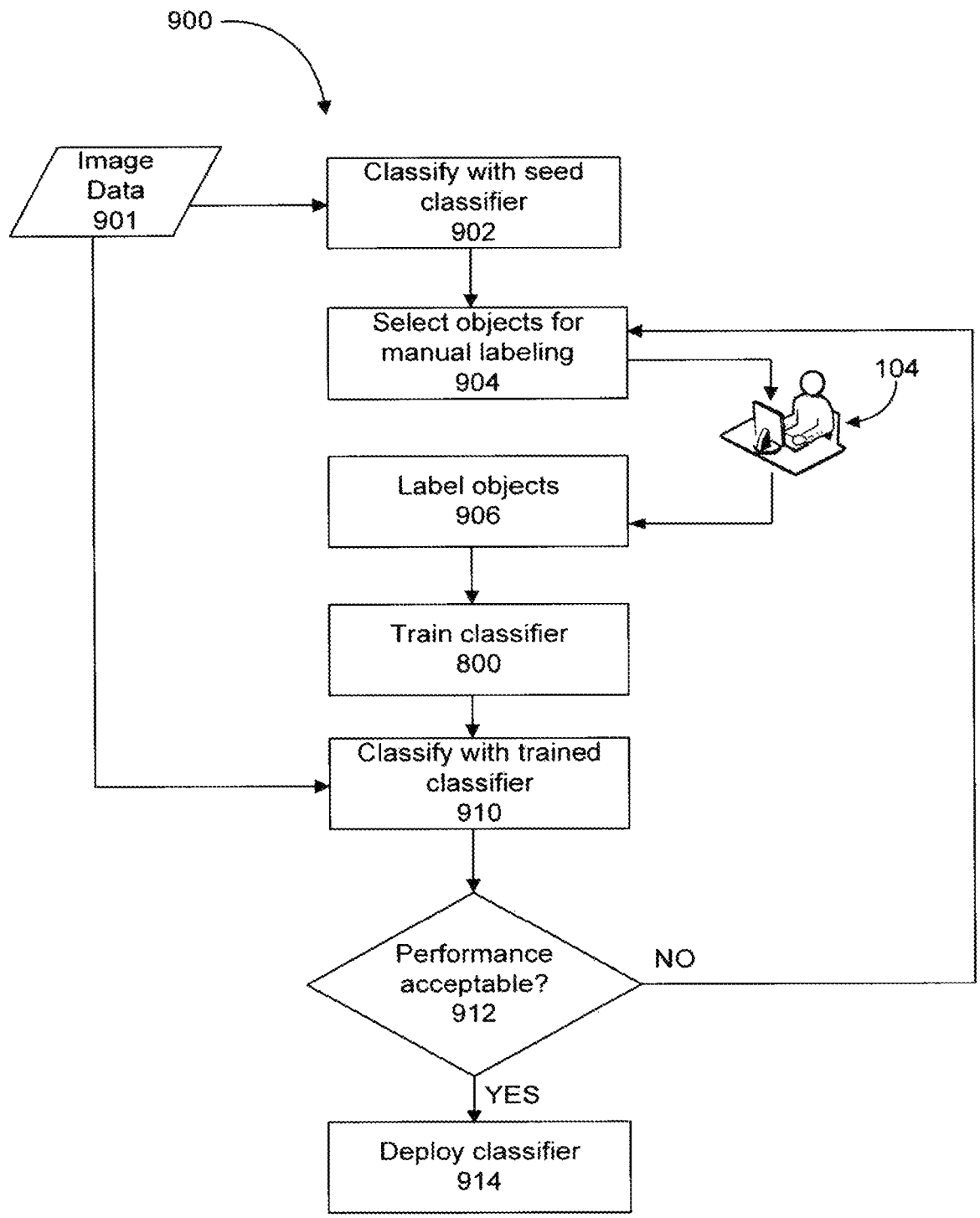
FIG. 9 is a flowchart of another object classifier training method.

Once an object classifier is trained with the labeled objects, the object classifier may continue through other training steps to refine the features/transformations selected for the different stages. A high-level approach to training an object classifier is shown in the flowchart of FIG. 9, which illustrates a training method 900. Image data 901 (e.g., raw video data) is supplied to a simple base or seed system that is capable of basic detection, tracking, and classification of objects. The base system detects, tracks, and classifies objects represented in the image data 901 and generates metadata corresponding to the objects (step 902). The base system selects a set of objects that are detected and tracked (step 904). The selection of the objects may depend on the amount of time an object was in the field of view of an image capturing device 102, or may depend on how confident the base system was in its classification of an object. Other rules may be specified for dictating whether or not an object is selected by the base system.

Images of the objects selected by the base classifier are presented on a display to a user so the user can manually label the objects as being members or non-members of the particular object class of the object classifier being trained. The user at the user interface 104 manually labels the objects, and the labeled objects are supplied to the object classifier being trained (step 906). The objects manually labeled by the user may correspond to the labeled objects described above. The object classifier is trained with the labeled objects, such as according to the training method 800 as described above with reference to FIG. 8. Image data 901 is supplied to the trained object classifier. The trained object classifier classifies the objects represented in the image data 901 and generates metadata representing the classes of the objects (step 910). Each object classified by the trained object classifier has a classification confidence level associated with it. The classification confidence level corresponds to the decision step value of the step 400 that classified the object as a member or non-member of the object class. The classification confidence levels generated by the trained object classifier are analyzed to identify objects that were confusing to the trained object classifier (e.g., objects with a low classification confidence level). The performance of the trained object classifier is evaluated to determine whether the object classifier's performance is acceptable (step 912).

To determine whether the object classifier's performance is acceptable a disjoint test set may be used in which the class of the objects of the disjoint test set are known prior to classification by the trained object classifier. The image data 901 supplied to the trained object classifier may correspond to the disjoint test set, and the classifications made by the trained object classifier may be compared to the actual classes of the objects. From this comparison, the performance of the trained object classifier may be determined. If the performance is not equal to or above some predefined performance level, the confusing objects are presented to the user for manual labels (step 904). The user labels the confusion objects and the new labeled objects are used to retrain the object classifier (steps 906 and 800). When the object classifier is retrained, the feature/transformation combinations for the different stages 500 may be updated based on the new labeled objects. The retrained object classifier is used to classify objects represented in the image data 901, and the performance of the retrained object classifier is evaluated (steps 910 and 912). The retraining process may continue until the performance of the trained object classifier is acceptable. When the performance of the trained object classifier is acceptable, it may be deployed (step 914). The training process may be recast into the following steps:

1. Manually label some small fraction of a dataset.
2. Train an object classifier using the fraction of the dataset.
3. Use a newly trained classifier to automatically label the complete dataset.
4. Select a set of automatically labeled data points that were confusing to the object classifier.
5. Manually label the confusing data points.
6. Repeat the training with all the new labeled data points.
7. Go to step 3.

Classification Confidence

The decision step value $s(X)$ is correlated with the confidence in classification. The correlation may not be linear, i.e., the step 400 may generate a high positive value, but the object may not be a member of the object class. Typically, by virtue of the training process, the higher the value of $s(X)$, the less likely that the step 400 made a mistake. The confidence level associated with a certain value of $s(X)$ may be calculated by first defining an indicator function $E(F(X))$ in which:

$$\varepsilon(\Gamma(X)) = f(s(X)) = \begin{cases} 0, & \text{Object belongs to the + class and } s(X) > 0 \\ 0, & \text{Object belongs to the - class and } s(X) \leq 0 \\ 1, & \text{Object belongs to the + class and } s(X) \leq 0 \\ 1, & \text{Object belongs to the - class and } s(X) > 0 \end{cases} \quad (10)$$

A confidence function, $\Psi(\Gamma(X))$, may be defined as the probability that the step 400 declared an object to belong to the positive class, and that it was correct for an output of $s(X)=v$. Thus, for a small quantization interval $[v-\Delta, v+\Delta]$, the confidence function may be expressed as follows:

$$\Psi(\Gamma(X)) = P_{\varepsilon,\Omega|\Gamma}(\varepsilon(\Gamma(X))=0, \omega=+\text{class}|s(X)<v+\Delta) - P_{\varepsilon,\Omega|\Gamma}(\varepsilon(\Gamma(X))=0, \omega=+\text{class}|s(X)<v-\Delta) \quad (11)$$

Note, it may be considered that the step 400 declares an object as belonging to the positive class when $s(X)>0$, i.e., $P_{\Omega|\Gamma}(\omega=+\text{class}|s(X)>0)=1$. Thus, for $v>0$, equation (11) can be expressed as:

$$\Psi(\Gamma(X)) = P_{\varepsilon,\Omega|\Gamma}(\varepsilon(\Gamma(X))=0|\omega=+\text{class}, 0<s(X)\leq v+\Delta) - P_{\varepsilon,\Omega|\Gamma}(\varepsilon(\Gamma(X))=0|\omega=+\text{class}, 0<s(X)<v-\Delta) \quad (12)$$

Equation (12) represents the true positive rate when $v \in [\Delta, 1-\Delta]$ and $s(X) \in [v-\Delta, v+\Delta]$.

Similarly, the confidence of a step 400 in declaring that the object belongs to the negative class for $v \leq -\Delta$, may be expressed as:

$$\Psi(\Gamma(X)) = P_{\varepsilon,\Omega|\Gamma}(\varepsilon(\Gamma(X))=0|\omega=+\text{class}, 0<s(X)\leq v+\Delta) - P_{\varepsilon,\Omega|\Gamma}(\varepsilon(\Gamma(X))=0|\omega=+\text{class}, 0<s(X)<v-\Delta) \quad (13)$$

Equation (13) represents the true negative rate when $v \in [-1+\Delta, -\Delta]$ and $s(X) \in [v-\Delta, v+\Delta]$. Thus, if the probability (as defined in equations (12) and (13)) that the step 400 is correct for any observed output value $s(X)=v$ is high, then the step 400 is considered to be confident in its answer. For this self-assessment of confidence, a probability measure $\hat{p}_{\varepsilon|\Omega,\Gamma}$ is estimated from the training data set and the confidence function $\Psi(\Gamma(X))$ is inferred. If the confidence function $\Psi(\Gamma(X))$ is less than a critical confidence threshold $\psi_c$ for a given output value for $s(X)$, then the step 400 is considered to be diffident or confused for that output value. Diffident classifications are forwarded to the next step 400. Thus the confidence function $\omega(\Gamma(X))$ may be used during training to identify the objects that are confusing to an object classifier. If discriminant functions that constitute the stages 500 are a good approximation to the Bayes optimal decision boundary, then the decision step value $s(X)$ will be monotonically related to the confidence function $\Psi(\Gamma(X))$. For the initial steps 400, the object classifier may not approximate the Bayes decision boundary well. Thus, the decision step value $s(X)$ for a given step 400 and the confidence function $\Psi(\Gamma(X))$ may not always be monotonically related.

The confidence function $\Psi(\Gamma(X))$ may be used to determine the acceptance threshold $\tau_a$ and the rejection threshold $\tau_r$ for the different steps 400. As opposed to other cascade classifier architectures, if the confidence function $\Psi(\Gamma(X))$ for the positive class is monotonically increasing with the decision step value $s(X)$, the acceptance threshold $\tau_a$ may be chosen such that true positive constraints are met. If the confidence function $\Psi(\Gamma(X))$ does not increase monotonically with the decision step value $s(X)$, then the acceptance threshold $\tau_a$ may remain saturated at 1, i.e., no patterns are accepted as the positive class in the corresponding step 400. A lack of monotonicity indicates that in the positive region, the decision boundary does not reflect the Bayes optimal classifier sufficiently well. Similarly, the rejection threshold $\tau_r$ is chosen if the negative class confidence is monotonically related to the decision step value $s(X)$. In practice, the negative class may be far more densely populated in feature space than the positive class. Thus, while a monotonic relationship may not exist for the positive class in early steps, it most likely exists for the negative class in the early steps.

Runtime Classifier Evolution

To this point, the classifier model, its classification operation, and its offline active learning have been described. Next, the classifier's online evolution will be described. The online runtime classifier evolution is similar to the offline active learning process described above and illustrated in FIG. 9. The runtime evolution includes the following steps: (1) Gathering user feedback; (2) training a new additional step for the classifier; (3) validating the classifier via passive observation; (4) if the classifier is passively validated, requesting user validation and deploying the classifier; and, if possible, (5) uploading the specialized classifier with performance statistics and site information to a central feedback server so that a more general classifier that absorbs the specialization can be created and trained.

Figure 10:
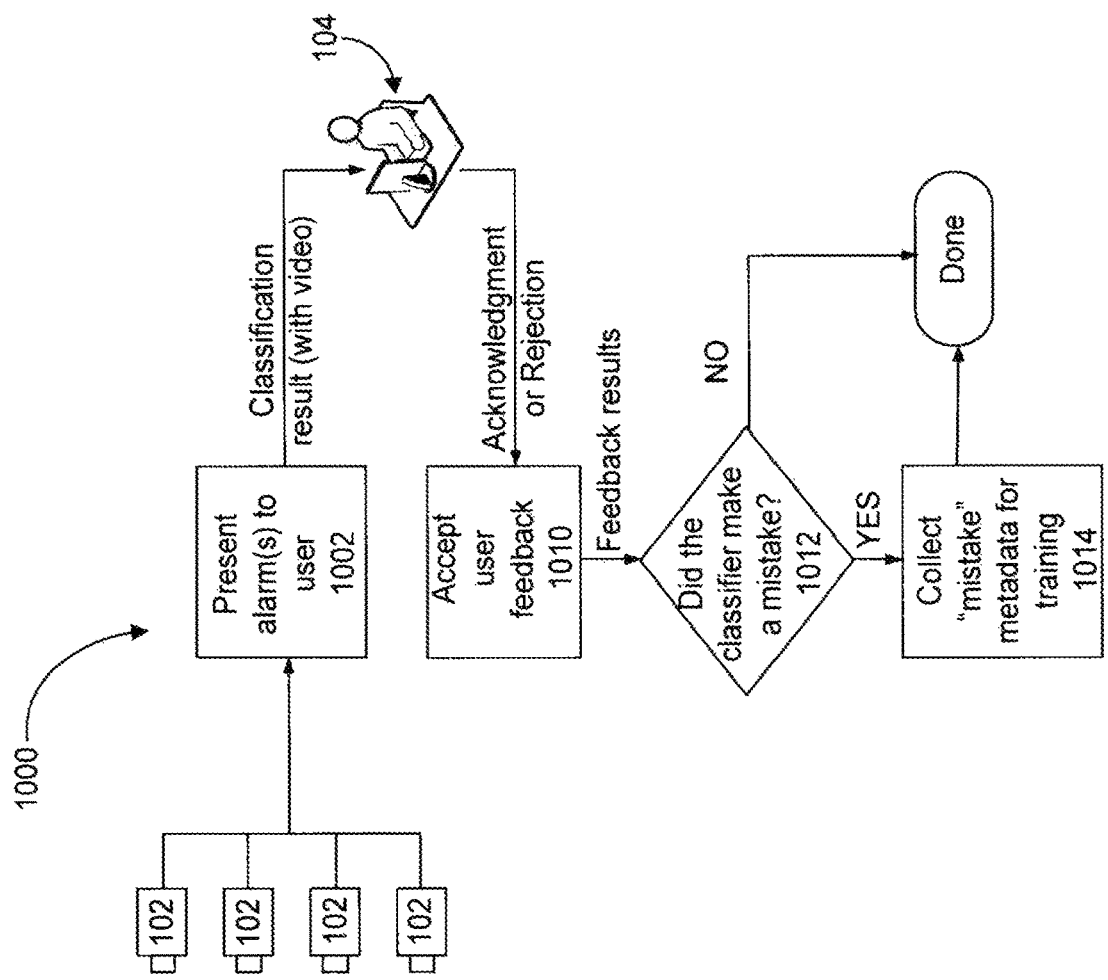
FIG. 10 illustrates a process for gathering feedback from a user operating a user interface.

FIG. 10 illustrates a process 1000 for gathering feedback from a user operating the user interface 104. In many security and surveillance systems, a user such as a security guard responds to and acknowledges alarms. If an alarm is deemed to be false, it may be documented as a false alarm or it may be ignored. A preferred embodiment of a system with runtime classifier evolution has the user explicitly inform the system when the alarm is a false alarm. Thus, the method 1000 presents the alarm(s) to the user (step 1002). The alarm presented to the user includes the classification result (i.e., the object's classification as determined by the classifier) and video data in which that object appears. The user can input an acknowledgement or rejection of the classification. The method 1000 accepts that user feedback (step 1010) and determines whether the classifier mistakenly classified the object (step 1012). The method 1000 gathers the set of features used for classification and saves it as "mistake metadata" (step 1014). When the number of mistakes exceeds a preset value, the method 1000 can initiate a corrective, "specialization" training procedure.

A mistake may take the form of a false positive, meaning that the classifier incorrectly accepted an object as being part of a positive class at a previous step in the cascade (e.g., the classifier classified a non-human as an object of the human type). A mistake may also take the form of a false negative, meaning that the classifier rejected an object and concluded it is a non-member of an object class when the object really is a member of that class (e.g., the classifier failed to classify a human as a human-type object). For instance, the classifier may assign a "suspicious" or "unknown" class to an object that it cannot classify with sufficient confidence. If such an object is really a human or vehicle or the like, the user can indicate that mistake.

A specialization training procedure may entail adding an additional step at the end of the cascade of steps that constitute the classifier and training that new step to separate false alarms from valid or "true" alarms, as indicated by the user feedback. The additional step added to the classifier can be referred to as a "specialization step." In a sense, the specialization step does assist the classifier to become more specialized in classifying objects presented to that particular classifier given its site, camera(s), etc.

Figure 11:
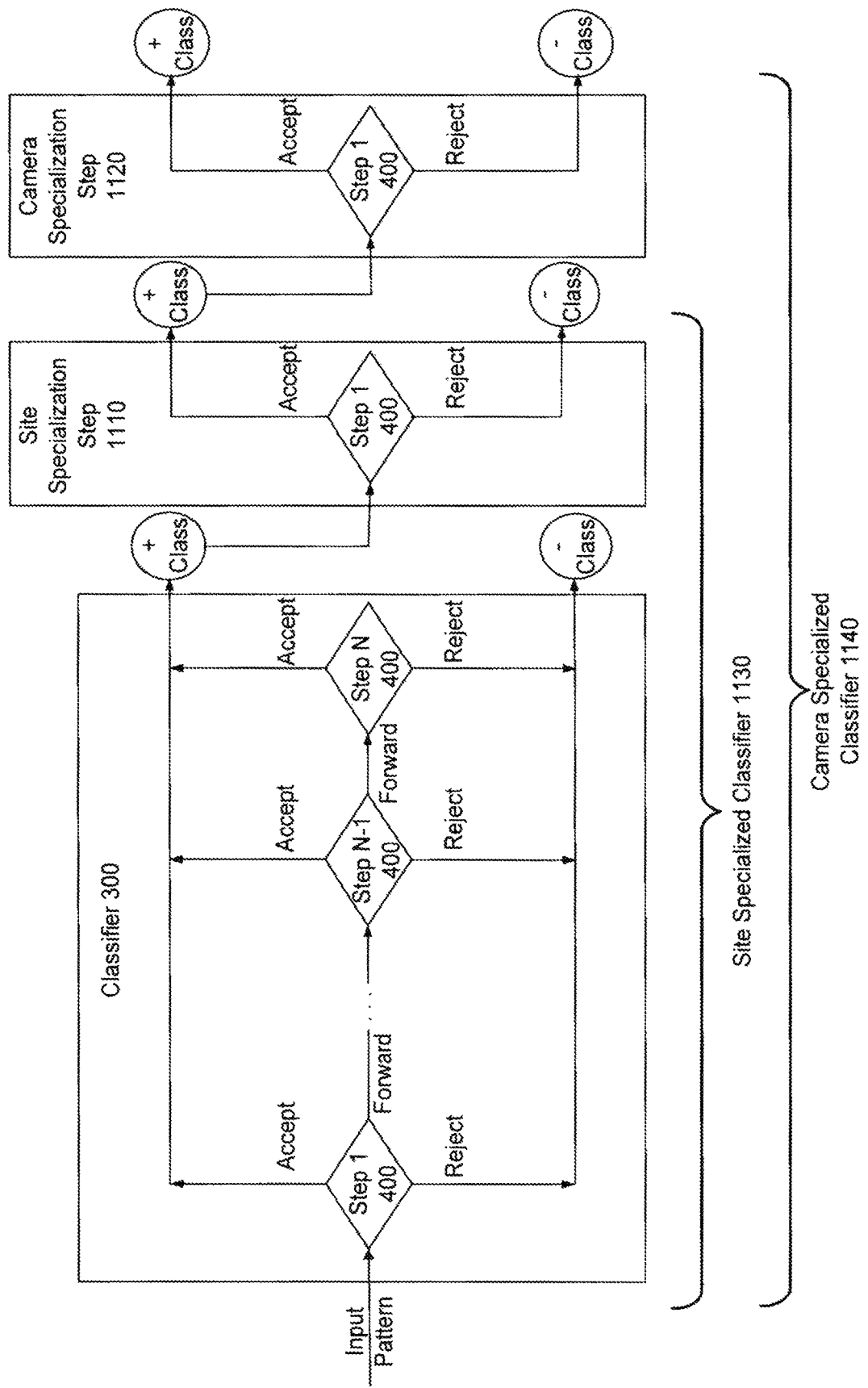
FIG. 11 is a block diagram of a specialized classifier.

According to one embodiment, specialization takes one of two forms: (1) site specialization and (2) camera specialization. In this embodiment, those specialization steps are trained using false alarm mistakes. Thus, as illustrated in FIG. 11, the classifier 300 has made an erroneous positive classification at some step 1 through N in its cascade. The false positives are transmitted from the classifier 300 to a site specialization step 1110 and then if necessary to a camera specialization step 1120, if present.

The site specialization step 1110 is a general step that is trained to reduce false alarms using features extracted as part of operation of the general classifier 300. The data used to train the site specialization step 1110 is site-specific. Thus, a site-specialized classifier 1130 (i.e., a classifier modified or augmented to include the site specialization step 1110) may not function with increased accuracy at a different site.

The camera specialization step 1120 is a step that is trained to reduce false alarms only for a specific camera. If site-specialized classifier 1130 fails to reduce the number of false alarms, then a camera-specialized classifier 1140 can be trained.

Figure 12:
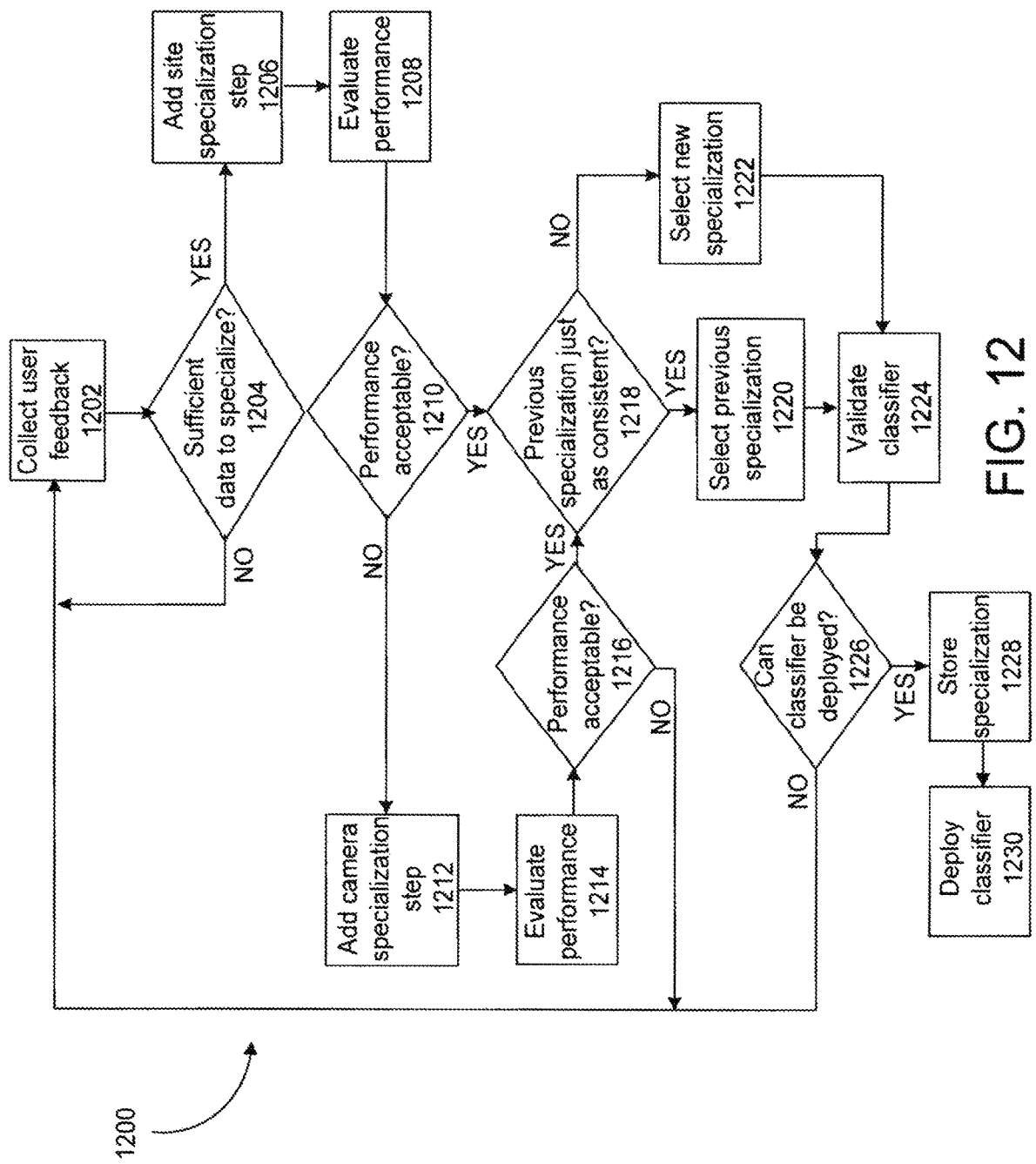
FIG. 12 is a flowchart of a specialization training process, including active validation.

FIG. 12 is a flowchart of a specialization training process 1200, including active validation. After a sufficient number of mistakes has been collected (steps 1202 and 1204), a site specialization step is added and trained (step 1206). The performance of the site specialized classifier is evaluated (step 1208) via a validation process. If its performance is acceptable, i.e., if its error rate is sufficiently lower than that of the general classifier, (step 1210), then the method proceeds to step 1218. If, however, the error rate is not sufficiently lowered, then a camera specialization step is added for each camera that was a source of the mistakes (step 1212). The performance of the camera specialized classifier is evaluated (step 1214) via a validation process. If its performance is acceptable (step 1216), then the method proceeds to step 1218. If the net error rate still is not sufficiently lowered, then the user feedback collection step 1202 is continued. If an improved classifier is constructed, then any previously trained specializations are tested (1218) to see if they are consistent with the new specialization. If there exists a previously trained specialization that is consistent, then the previously trained specialization is selected (step 1220) and directed to a passive validation step 1224 of the method 1200. Otherwise, the newly trained specialization is selected (step 1222) and passively validated at step 1224 of the method 1200. If the new specialization is validated and can be deployed (step 1226), it is added to the database of specialization steps (step 1228) and actually deployed (step 1230). The storing step 1228 is advantageous, as different specializations may be required for different seasons of the year or different configurations of the scene under surveillance. Thus, it is possible for a previously deployed specialization to be reused at a later time.

Two distinct validation operations may be carried out before deploying a classifier. First, passive validation compares the feedback offered by the user acknowledging the alarms and the decisions of the specialized classifier. If the specialized classifier is more consistent with the user than the deployed classifier, the specialized classifier is considered to be valid and then may be subjected to active validation, which is the second type of validation. During active validation, the system actively presents the user with the specialized classifier, showing the false alarms that the specialized classifier rejected and/or true positives rejected by the specialized classifier. The user selects the mistakes that are acceptable and those that are not. The system then attempts to adjust the rejection threshold $\tau_r$ and/or the acceptance threshold $\tau_a$ for the specialized classifier such that the user's preferences are most closely met. If the performance goal cannot be met, then the classifier is declared as invalid and the data collection step continues. Otherwise, the specialized classifier is deployed.

Figure 13:
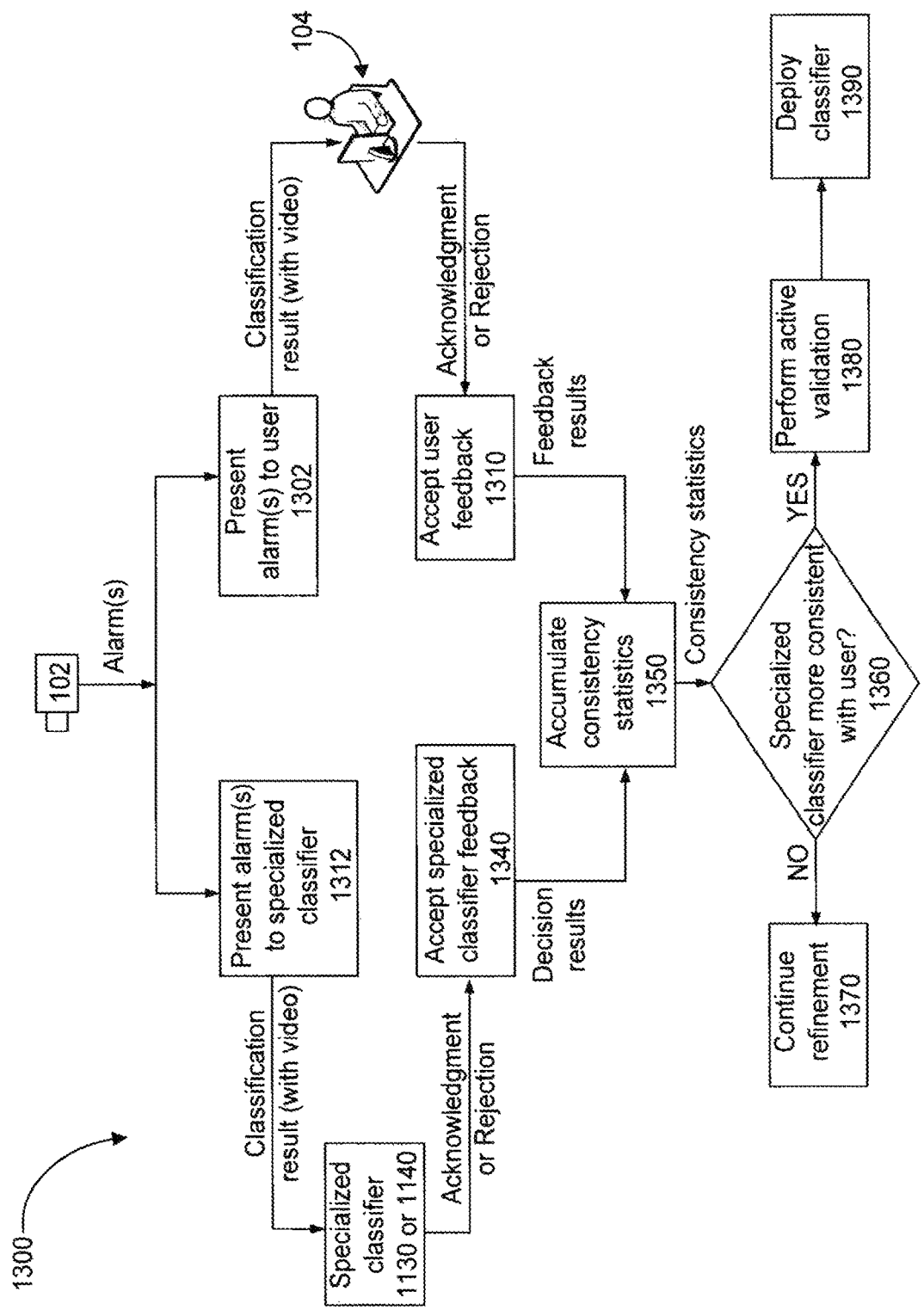
FIG. 13 illustrates a passive validation process in more detail.

FIG. 13 illustrates a passive validation process 1300 in more detail. The process 1300 presents alarm(s) from a camera 102 to both a user and a specialized classifier (steps 1302 and 1312). The user at the user interface 104 either acknowledges of rejects the alarm(s), and that user feedback is accepted by the process 1300 (step 1310). Likewise, the specialized classifier either accepts or rejects the alarm-raising objects as members of the class that gave rise to the false alarm, and those decision results are accepted by the method 1300 (step 1340). The process 1300 automatically compares user feedback acknowledging alarms with decisions made by the specialized classifier (step 1350). If the specialized classifier is not more consistent with the user than is the deployed classifier (step 1360), the then it is subjected to continued refinement (step 1370). If the specialized classifier is more consistent with the user than is the deployed classifier (step 1360), the specialized classifier is considered to be valid and is passed on to an active validation operation (step 1380). An increase in consistency implies that the specialization is able to reject the majority of false alarms while not rejecting true alarms. Only more consistent specializations are forwarded to the active validation step 1380 and ultimately deployed (step 1390).

Figure 14:
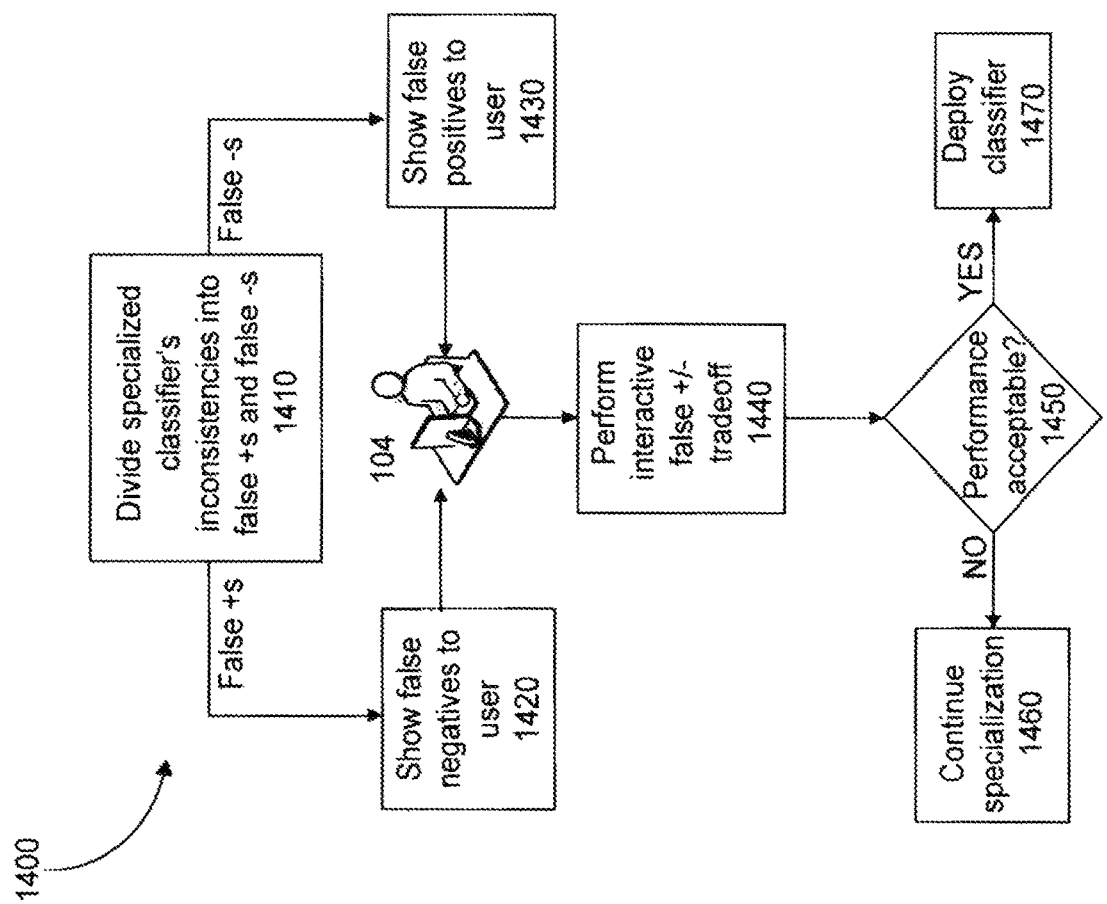
FIG. 14 is a flowchart of an active validation process.

FIG. 14 shows an active validation process 1400 that actively engages a user to validate a specialized classifier. The user employed in the active validation process is preferably a supervisor, manager or other higher-ranking person more adept at catching errors or intentional sabotage to the system. The process 1400 divides specialized classifier inconsistencies into false positives and false negatives (step 1410). The process 1400 presents both to the user (steps 1420 and 1430). The user at the user interface 104 then categorizes mistakes as acceptable or unacceptable. A false alarm/false negative trade-off is automatically performed by choosing $\tau_r$ appropriately (step 1440). Increasing $\tau_r$ increases the number of false negatives while reducing the number of false positives. The system attempts to adjust $\tau_r$ so that the specialized classifier meets the user's preferences most closely. If the performance is unacceptable (step 1450), the classifier is declared invalid and the data collection step continues (step 1460). Otherwise, the specialized classifier is deployed (step 1470).

By learning and/or specialization, the classifier can adapt to its environment and changes thereto automatically. A camera system with such a classifier may need little or no manual field geometric calibration or tuning. That can result in a substantial cost savings by reducing or eliminating the need for labor by trained personnel to install the system or to adjust the system such as when the seasons change or a camera is moved. A camera system utilizing a classifier as described herein can often be installed by anyone familiar with camera installation.

Another benefit of an accurate classifier is that improved accuracy in classifying objects can improve the quality of feedback supplied to an object detection module and its components, such as a foreground/background separator as described in the above-referenced U.S. patent application Ser. No. 10/884,486, thereby further improving the performance of the overall system.

Figure 15:
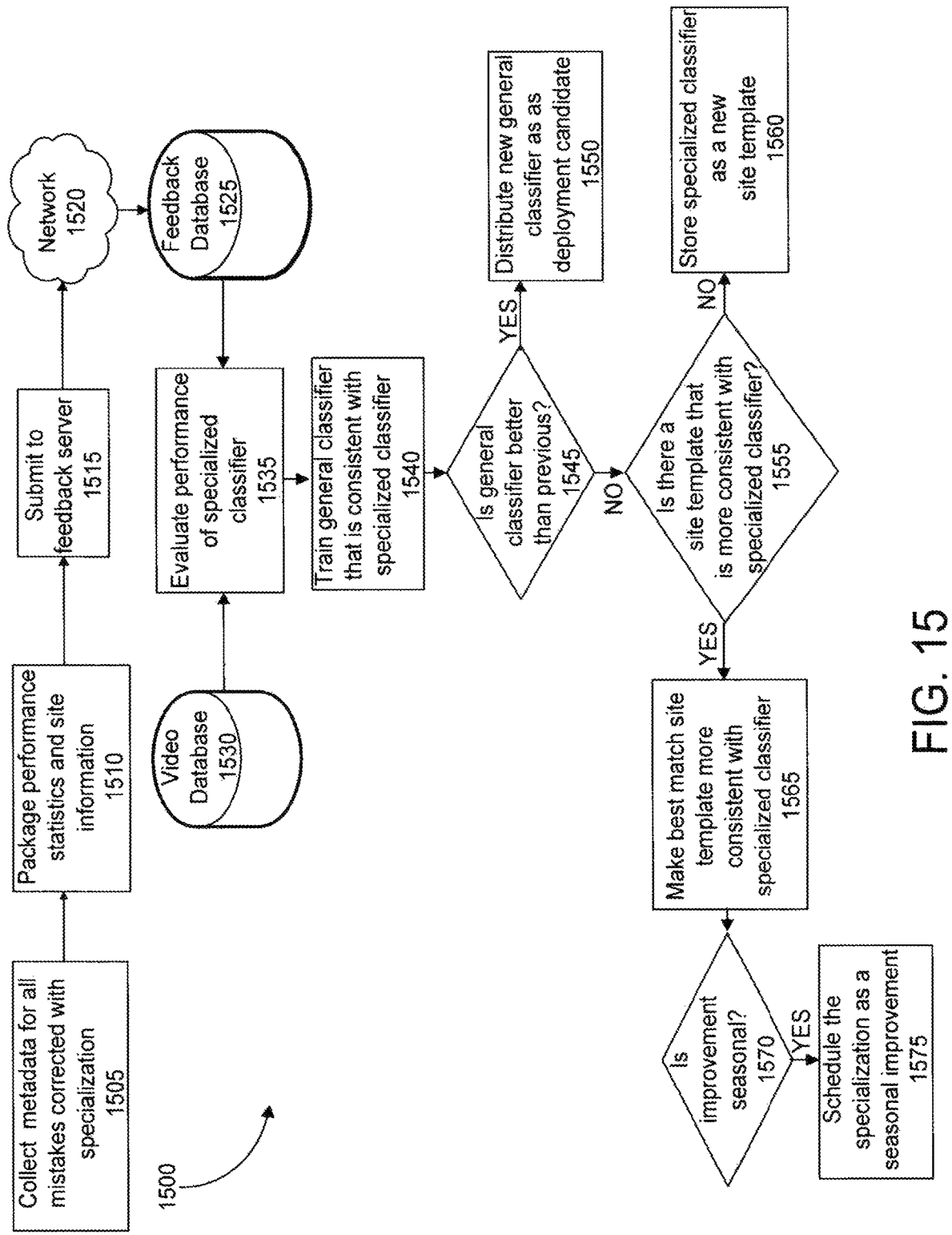
FIG. 15 shows a feedback collection and generalization process.

Another benefit can occur when feedback about accurate classifiers is collected from various sites. In particular, if a specialization is trained and the site specialization step offers considerable performance improvement, then the specialized classifier can be uploaded to a central feedback server. FIG. 15 shows a feedback collection and generalization process 1500 in detail. If permitted by the user/site, mistake metadata for mistakes corrected with specialization are collected (step 1505), packaged with performance statistics and site information (step 1510) and submitted to a feedback server (step 1515) via a network 1520. At the feedback server, the metadata and associated data are stored in a feedback database 1525. The process 1500 evaluates the performance of the specialized classifier using the mistake metadata and video data stored in a video database 1530 at or accessible by the feedback server (step 1535). In this way, the specialized classifier may be used to automatically label a large corpus of training data. Unlabeled data for which the general classifier disagrees with the specialized classifier can be presented to the user for labeling at the central training facility (not shown). A new general classifier is then trained to be consistent with the specialized classifier for those patterns that it classified correctly (step 1540). Specializations accumulated from multiple sites can be used in a similar fashion. If a new general classifier can be trained that is more consistent with all the uploaded specialized classifiers, the new general classifier is distributed to all sites for possible deployment. Specifically, the process 1500 tests whether the general classifier is better than previous ones (step 1545). If so, it can be distributed as a new general classifier for deployment at sites (step 1550). If not, then the specialized classifier is marked as a site template. When a specialized classifier's performance is deemed to be site-specific, its decisions are compared to stored site templates (step 1555). If there exists a site template that is more consistent with the specialized classifier, then the site template can be updated (1565). Otherwise, the specialized classifier can be stored as a new site template (step 1560).

Optionally, the process 1500 can test whether site template is a seasonal improvement (step 1570) and, if so, schedule the specialization as such (step 1575).

Central consolidation and distribution of feedback and updated new or updated classifiers or classifier parameters enables integrating community feedback based on recognition errors. Data for customer sites experiencing similar problems may be consolidated and a new classifier can then be trained and disseminated. That broad-based feedback allows for a broad collection of information to be incorporated in training a new classifier; for instance, information about false alarms from various systems can be shared. In general, metadata includes sufficient information for the classifier to learn, without needing to access the original video data. When a new classifier is updated internally at a customer site, the new version of the classifier is also transmitted to other customers. For example, the new classifier can be used to determine which customer sites have similar sources of false alarms. As the number of deployed systems grows, the quantity and quality of collected feedback can also grow, thereby enabling the generation of more accurate general classifiers based on that feedback.

Periodic updates can be pushed to all networked cameras, much like an anti-virus system. The classifier specification can be viewed as a new object definitions file. Each new definitions file can be verified at the customer using passive and active validation mechanisms. If the new definitions file is verified, then it is presented to the user for deployment.

Figure 16:
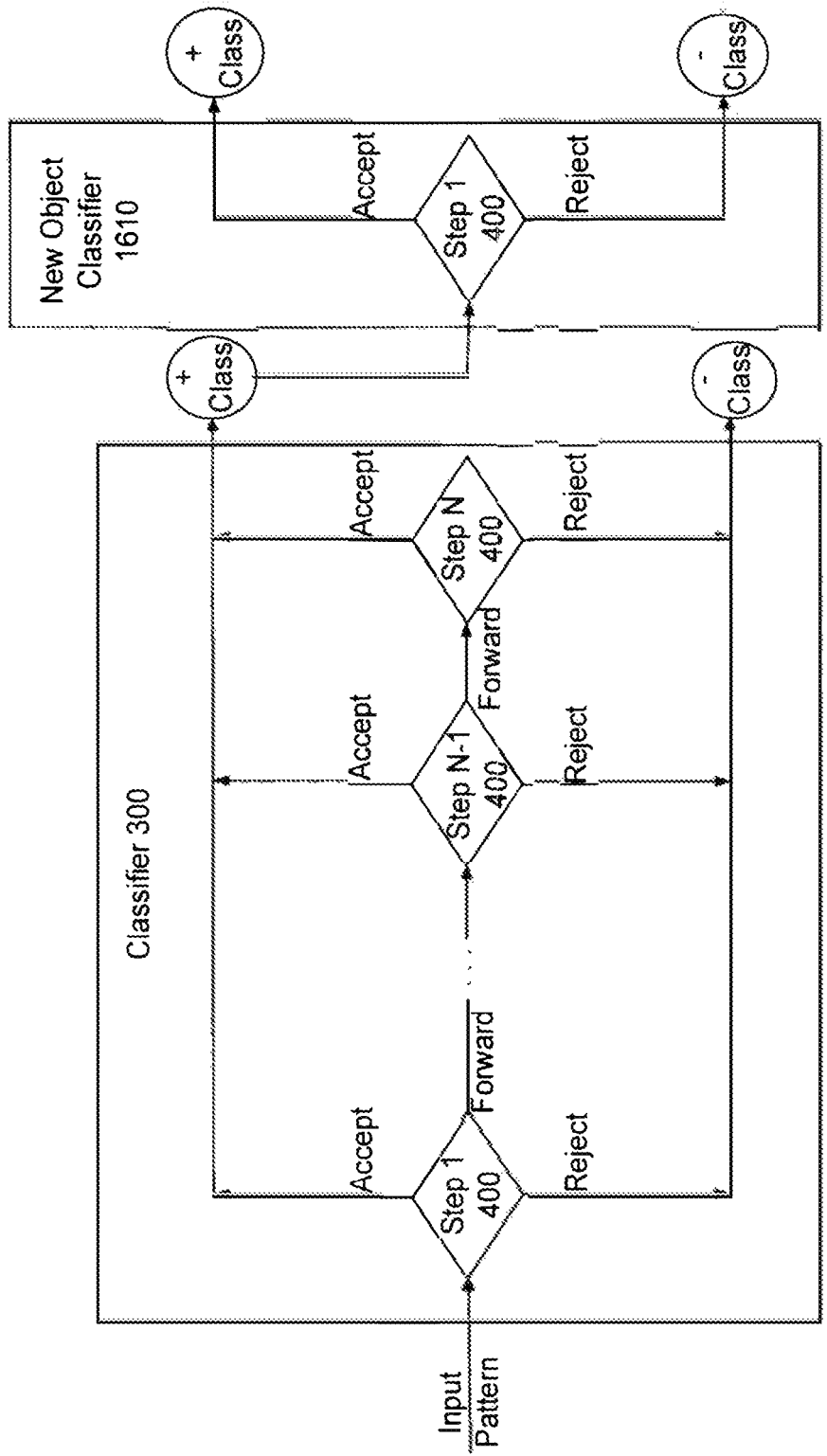
FIG. 16 is a block diagram of a classifier with an added step to recognize a new object type.

Learning new general object classes follows the same procedure as the active learning process described previously. Site specific learning of new object classes follows the same process as the false alarm reduction process. In a typical case, a new class is usually a specific type of a more general class. For example, a user may want to distinguish a delivery truck from other vehicles. Thus, the class "Delivery truck" is a specific type of vehicle. A specialization architecture, such as shown in FIG. 16, with a new object classifier 1610, can then be executed as a separate classifier rather than a modification of an existing class. The specialization process can be viewed as a false alarm reduction process in which vehicles that are not delivery trucks are false alarms. Passive and active validation operations are preferably completed before a new classifier for the new object class is deployed.

Automatic Calibration

A calibration module can be included in the video analytics module 200 (FIG. 2) to automatically update representative sizes of various classified objects in response to classifications performed by the object classification module 210 during live operation. Conversely, the calibration module can supply information representing updated representative sizes to the object classification module to improve its classification performance.

Figure 17:
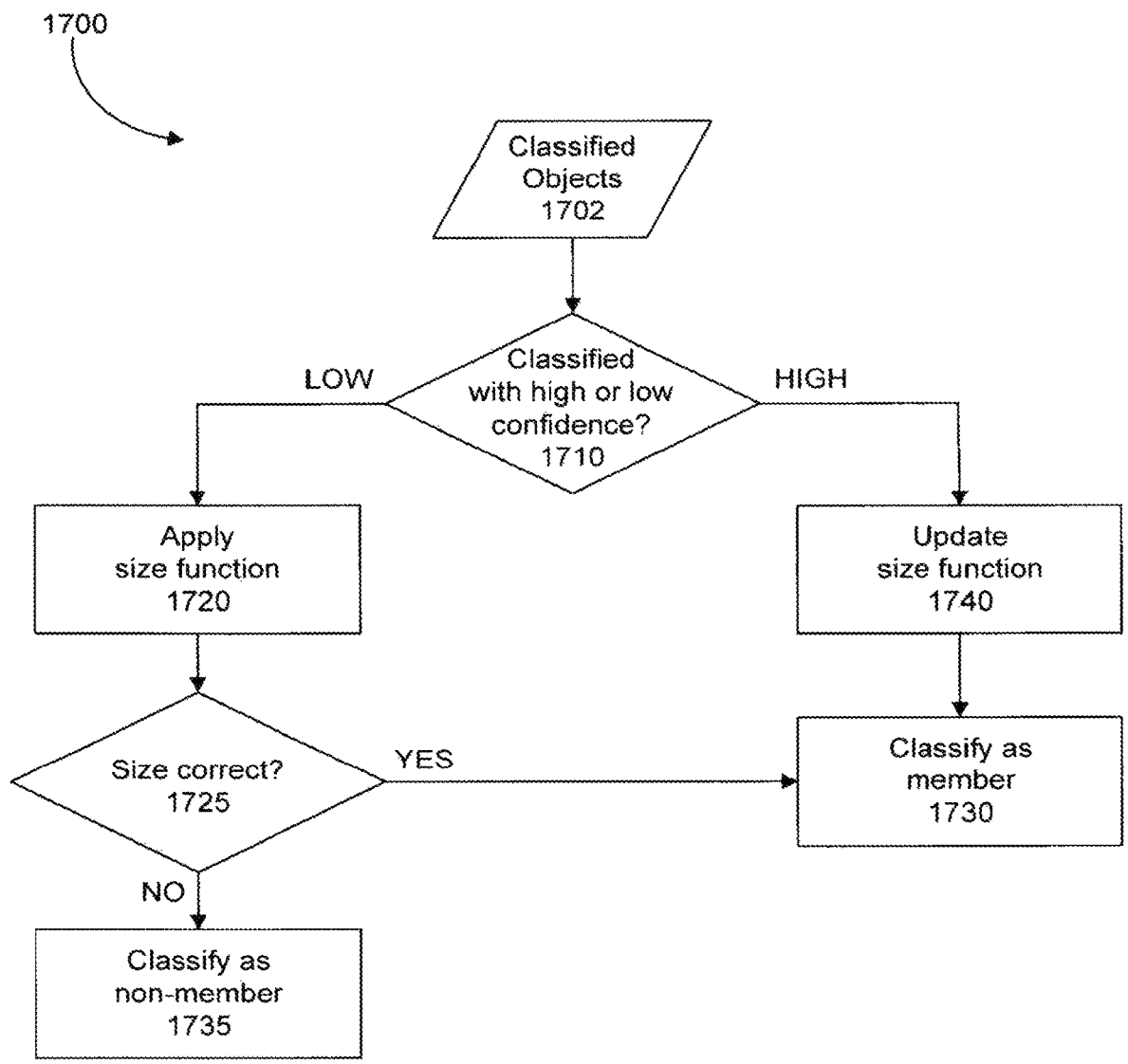
FIG. 17 is a flowchart of a calibration method utilizing and updating a size function.

FIG. 17 is a flowchart of a method 1700 utilizing and updating a size function that relates a size of an object of a given type to its location in a field of view. The size function may be a parameterized function of position, such as a second-order polynomial in X and Y coordinates. As classified objects 1702 that have a generally constant dimension across all members of the class (e.g., height of human adults) are made available by the object classification module, the method 1700 determines whether they are classified as members of that class with high or low confidence (step 1710), preferably by examining the confidence estimate, described above. If the confidence is low, then the size function is applied to the object at its current position (step 1720) and the value returned by the size function is compared to the actual size in the image to determine if they match sufficiently closely (step 1725). If so, then the classification of the object 1702 as being a member of the object class can be confirmed as correct (step 1730). If the actual and size-function-computed sizes do not match sufficiently closely, then the method 1700 classifies the object as being a non-member of the object class (step 1735). In either case, whenever the classifier's confidence is low, the size function is unchanged, as it would be imprudent to attempt to calibrate the size function using questionable data.

If the confidence of the classification is high, then the object is classified as a member of the class (step 1730) regardless of its size. In this case, moreover, the size function is updated (step 1740) using the object's actual size as an additional data point for the expected size of that class of object at the location where it appears in the image. The size function is updated by modifying its parameters, such as by a recursive least squares algorithm or similar algorithm. Thus, next time, a low-confidence object is presented, the updated size function will be applied to either confirm or deny the classification. In this way, the object classification is automatically calibrated during runtime operation using live reliable data.

The size function may be any parameterized function whose parameters can be determined by fit and adjusted. For example, a height size function of the form can be utilized:

$$\text{height}(x,y) = ax + by + c \tag{14}$$

Other functions, such as higher-order polynomials, can be utilized, if desired. The parameters a, b and c can be determined based on a least squares error fit or other suitable criteria, preferably performed recursively, with an iteration occurring every time the step 1740 is performed.

It is also possible to employ an optional size error function to estimate the size estimation error. The size error function is similarly a parameterized function of the coordinates in the image field of view, error(x,y) and is an estimate of the difference between the size function and the actual size. The size error function itself can be recursively updated each time an actual size of an object is measured. If the size error function returns a value that is too high (i.e., above a threshold), then the size function may be invalid and should not be utilized to help classify objects classified by the object classification module 210 with low confidence. Thus, the size error function can serve as a self-checking technique for the automatic calibration, preventing erroneous calibration. If there are large errors several times for high-confidence objects, then the calibration can be declared invalid, perhaps due to an external change such as movement of the camera. During periods when the calibration is off, the method 1700 can continue to update the size and size error functions (i.e., in the high confidence branch on the right side of FIG. 17) until the size error becomes acceptable, at which time, automatic size-based confirmation/rejection of low-confidence objects (i.e., in the low confidence branch on the left side of FIG. 17) can resume.

An object height grid may optionally be constructed in the image plane in which, for each grid cell, the average height of an object is estimated without aid of manual calibration. A polynomial fit can then be estimated to map the bottom location of an object to its top location and vice versa. Over time, accurate object size estimates may be generated automatically for different parts of the scene, with or without incorporating active user feedback. In a preferred embodiment, a manual calibration process is not necessary to achieve accurate object size estimations. As greater accuracy is developed, the confidence level of the learned information rises, so that object size estimates may be used to reduce false detections. Using height information from validated and tracked objects together with camera lens information, a complete set of camera parameters may then be estimated, and in turn used to estimate a ground plane and image-to-real-world coordinate mapping. With sufficient confidence, geometric information may be transferable for use in detecting objects located above the ground plane, for instance, on upper levels of a parking garage in which multiple floors contain similar vehicles.

Figure 18:
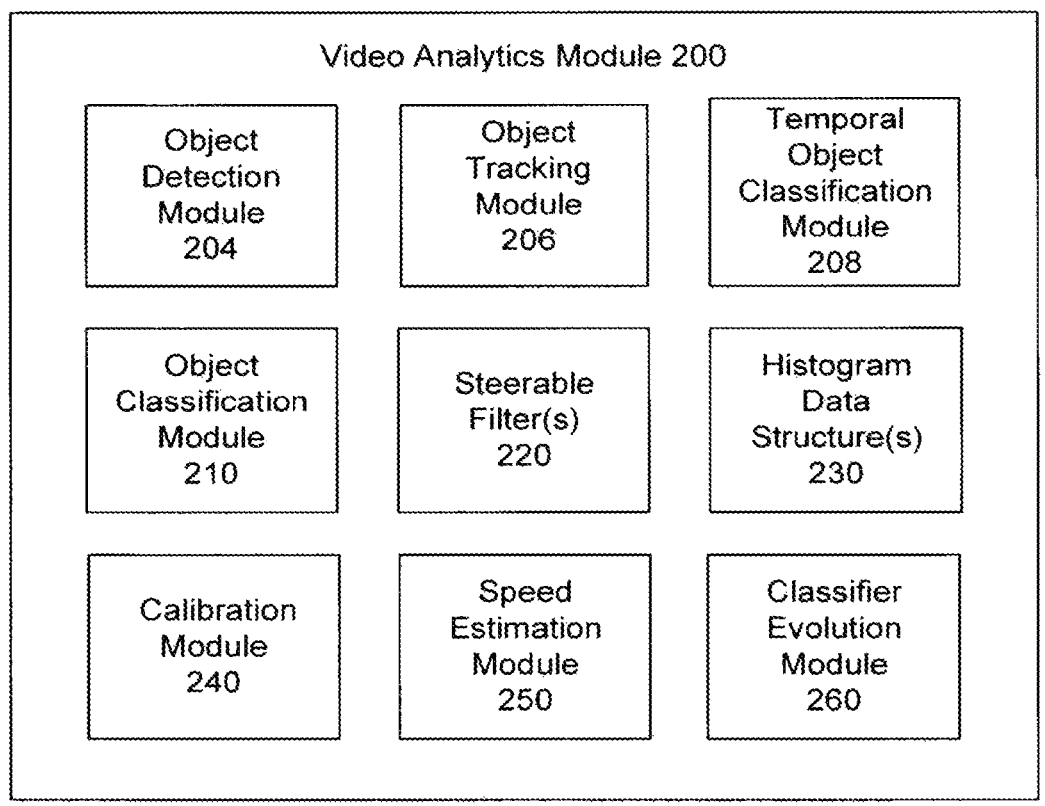
FIG. 18 is a block diagram of the video analytics module of FIG. 3, according to another embodiment.

FIG. 18 is a block diagram of the video analytics module 200, according to another embodiment, including a calibration module 240, which performs an automatic calibration process, such as the method 1700 described above. FIG. 18 also illustrates an number of other optional modules, such as a speed estimation module 250, which can be used in conjunction with the calibration module 240 to estimate speeds of classified objects in the field of view using scale information derived from the size information generated by the calibration module 240.

FIG. 18 also depicts a classifier evolution module 260, which can perform an in-field or in-use self-learning or evolution of the object classification module, such as by any of the techniques described herein. FIG. 18 also depicts one or more steerable filters 220, which can be used to calculate edge orientation values. Finally, FIG. 18 depicts one or more histogram data structures 230, which represent various histograms, such as edge orientation histograms or color histograms, used as object features for purposes of object classification. Histogram information can be stored in a data structure having a number of bins and bin counts, the values of which represent occurrences of a variable between bin bounds. Unlike as shown, one or more of the modules and other objects illustrated in FIG. 18 may be separate from the video analytics module 200 and may reside elsewhere in the camera 102 or other part of the camera system 100.

As used herein, the term "module" is a component that may comprise one or more hardware circuits or devices and/or one or more software routines, functions, object or the like. A module may be entirely hardware, entirely software, comprise firmware, or comprise some combination of the foregoing. As used herein, the term "system" refers to a tangible thing.

The methods, modules and systems illustrated and described herein can exist in a variety of forms both active and inactive. For example, they can exist partially or wholly as one or more software programs comprised of program instructions in source code, object code, executable code or other formats. Any of the above can be embodied in compressed or uncompressed form on a computer-readable medium, which include storage devices. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes.

CONCLUSION

The terms and descriptions used above are set forth by way of illustration only and are not meant as limitations. For example, the classifier may be part of—and the classification methods may be performed at—a remote processing unit, such as the remote storage/processing unit 106 (FIG. 1), a computer associated with the user interface 104, another node in the camera network 108, or another server, such as one at a central location or on another network. Those skilled in the art will recognize that those and many other variations, enhancements and modifications of the concepts described herein are possible without departing from the underlying principles of the invention. The scope of the invention should therefore be determined only by the following claims and their equivalents.

What is claimed:

1. A method of improving performance of video analytics for a camera system in response to a detection preference of a system user, comprising:
receiving image data representing multiple images of a scene of a field of view of the camera system, the multiple images including representations of multiple objects, a first set of the multiple objects having members of an object class, and a second set of the multiple objects not having members of the object class;
using video analytics implemented with a general classifier that performs general classifier steps in analyzing the received image data to produce a general classification determination classifying the multiple objects as either members or non-members of the object class;
generating mistake metadata in response to acknowledgement by the system user that the general classification determination resulted in a mistaken classification determination based on the detection preference of the system user; and
generating a specialized classifier using the mistake metadata;
training the general classifier to be consistent with the specialized classifier.

2. The method according to claim 1, wherein classifying the multiple objects generates a confidence parameter for each object among the multiple objects, the confidence level representing a measure of confidence that the each object among the multiple objects is a member of the object class.

3. The method according to claim 2 wherein the confidence level is used to determine whether to include a classified object in the multiple objects for presentation to the system user.

4. The method according to claim 1, wherein the general classifier is operable to classify an object as a human or non-human.

5. The method according to claim 1, wherein the general classifier is operable to classify an object as a vehicle or non-vehicle.

6. A camera system comprising:
video analytics for processing image data representing multiple images of a scene of a field of view of the camera system, the multiple images including representations of multiple objects, a first set of the multiple objects having members of an object class, and a second set of the multiple objects not having members of the object class, the video analytics comprising:
a general classifier for performing general classifier steps in analyzing the received image data to produce a general classification determination classifying the multiple objects as either members or non-members of the object class;
wherein the video analytics is operable to generate mistake metadata in response to acknowledgement by the system user that the general classification determination resulted in a mistaken classification determination based on the detection preference of the system user; and
wherein the video analytics is further operable to improve performance based on the mistake metadata by generating a specialized classifier using the mistake metadata; and
wherein the general classifier is trainable to be consistent with the specialized classifier.

7. The camera system of claim 6, wherein classifying the multiple objects generates a confidence parameter for each object among the multiple objects, the confidence level representing a measure of confidence that the each object among the multiple objects is a member of the object class.

8. The camera system of claim 7 wherein the confidence level is used to determine whether to include a classified object in the multiple objects for presentation to the system user.

9. The camera system of claim 6, wherein the general classifier is operable to classify an object as a human or non-human.

10. The camera system of claim 6, wherein the general classifier is operable to classify an object as a vehicle or non-vehicle.

* * * * *